US012744796B2

(12) United States Patent
Bar Shalom et al.

(10) Patent No.: US 12,744,796 B2
(45) Date of Patent: Sep. 22, 2026

(54) SECURITY ACTION BASED ON COMMUNICATION-BASED ANALYSIS

(71) Applicant: Microsoft Technology Licensing, LLC, Redmond, WA (US)

(72) Inventors: Doron Bar Shalom, Le Mont-sur-Lausanne (CH); Andrey Karpovsky, Kiryat Motzkin (IL); Fady Copty, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 18/908,220

(22) Filed: Oct. 7, 2024

(65) Prior Publication Data

US 2026/0100959 A1 Apr. 9, 2026

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1433* (2013.01)

(58) Field of Classification Search
CPC ... G06F 21/552; G06F 21/554; H04L 41/147; H04L 41/16; H04L 63/1408; H04L 63/1416; H04L 63/1433; H04L 63/1441; H04L 63/20; H04W 12/122
See application file for complete search history.

(56) References Cited

U.S. PATENT DOCUMENTS

| | | | | |
|---|---|---|---|---|
| 10,728,262 | B1 * | 7/2020 | Vaswani | G06F 21/62 |
| 2023/0308461 | A1 * | 9/2023 | Flysher | G06N 20/00 |
| 2024/0146746 | A1 * | 5/2024 | Bhatia | H04L 63/1416 |
| 2024/0333743 | A1 | 10/2024 | Bazalgette | |

OTHER PUBLICATIONS

Extended European search report received in European Application No. 25205781.5, mailed on Dec. 16, 2025, 12 pages.

* cited by examiner

*Primary Examiner* — Olugbenga O Idowu
(74) *Attorney, Agent, or Firm* — Wade IP Law PLLC

(57) ABSTRACT

Techniques are described herein that are capable of performing a security action based on a communication-based analysis. A security event, which is triggered by an operation performed by a user in an organization, is detected. A security analysis result is generated by determining whether a communication history of the user includes (1) a communication from the user that initiates an interaction with another user in the organization and/or a communication that is addressed specifically to the user from another user in the organization, (2) a communication from the user that references the operation, and/or (3) a communication that provides an explanation of a purpose of the operation that satisfies an explanation criterion. In response to the security event, a security action is performed with regard to the operation as a result of the security analysis result satisfying a security criterion.

20 Claims, 7 Drawing Sheets

100

102A
First User Device

102B
Second User Device

102M
Mth User Device

104
Network

106A
First Server(s)

108
Communication-Based Analysis Logic

106B
Second Server(s)

106N
Nth Server(s)

SECURITY ACTION BASED ON COMMUNICATION-BASED ANALYSIS

BACKGROUND

Cybersecurity includes measures that are taken to protect a system (e.g., a computer or a network) from cyberattacks (a.k.a. attacks, digital attacks, or malicious attacks). One common challenge that such measures seek to address is detection of malicious activities with regard to the system. Conventional techniques for detecting malicious activities sometimes result in a substantial number of false positives and/or false negatives, resulting in a relatively low signal-to-noise ratio (SNR). A false positive is an incorrect determination that a non-malicious activity is malicious. A false negative is an incorrect determination that a malicious activity is not malicious. It may be desirable to increase the SNR of the conventional techniques by reducing the number of false positives and/or false negatives that are produced. For instance, reducing the number of false positives may enable security teams to concentrate on the most crucial matters (e.g., activities that are indeed malicious), which may increase the security of the system. Reducing the number of false negatives may increase the security of the system, for example, by enabling security actions to be performed with regard to the detected malicious activities.

SUMMARY

Artificial intelligence (AI) is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

A security event is an event that indicates performance of a potentially malicious activity. Examples of a potentially malicious activity include but are not limited to a failed login attempt (i.e. a failure to login to a system), suspicious network activity (e.g., an uncommon pattern of data transfer or an attempt to access sensitive files), an installation of software, and receipt of a phishing email. One example of a security event is receipt of a security alert. A security alert is an alert indicating that a resource is potentially a target of a cyberattack. The security alert may be triggered by a misconfiguration of the resource or a system via which the resource is accessible or by an unexpected, highly impactful, or rare activity being performed with regard to the resource or the system. For instance, a threat actor may exploit a vulnerability of the resource or the system to perpetuate the cyberattack.

Example types of a resource include but are not limited to a hardware resource, a software resource, and a network resource. Examples of a hardware resource include but are not limited to a server, a storage device (e.g., solid-state drive (SSD) or a network-attached storage (NAS)), network equipment (e.g., a router, a switch, or a firewall), and a data center. Examples of a software resource include but are not limited to an operating system, an enterprise application, a database management system (DBMS), a software subscription, a virtual machine, an identity (e.g., an identity of a user of a resource, a software application, or an enterprise), a secret, a process, a file, and a folder. Examples of a network resource include but are not limited to a local area network (LAN), a wide area network (WAN), and an Internet connectivity component (e.g., an Internet service provider (ISP) component or a virtual private network (VPN) component). For instance, an ISP component may provide Internet access, email, web hosting, and domain registration. A VPN component may provide encryption, privacy, remote access, and bypassing of geo-restrictions.

A resource may be a runtime resource. A runtime resource is a resource that is required for a software application to execute. In an aspect, the runtime resource(s) are provided by a runtime environment or a runtime system, which serves as an intermediary between code of the software application and the underlying hardware and operating system associated with the software application. A runtime resource may have any suitable functionality, including but not limited to memory management, input/output management, error handling, debugging, and optimization. Memory management includes allocating and deallocating memory as needed by the software application. Input/output management includes handling data input from input devices (e.g., a keyboard, a keypad, or a microphone) and output to output devices (e.g., a screen, a speaker, or a printer). Error handling includes management of exceptions and errors that occur during execution of the software application. Debugging includes providing tool(s) that enable a user (e.g., a developer) of the software application to find and fix bugs in the software application. Optimization includes increasing performance of the software application (e.g., by optimizing execution of the software application).

Examples of a cyberattack include but are not limited to a denial of service (DoS) attack, a distributed DoS (DDoS) attack, a man-in-the-middle (MITM) attack, a malware attack, a phishing attack, a ransomware attack, and a cross-site scripting (XSS) attack. A DoS attack is an attack that renders a system unable to respond to a legitimate service request by overwhelming resource(s) of the system. A DDoS attack is similar to a DoS attack but involves multiple (e.g., a vast array) malware-infected hosts that are controlled by the threat actor to cause resource exhaustion. An MITM attack is an attack that enables the threat actor to eavesdrop on data exchanged between multiple entities (e.g., people, networks, or computers). A malware attack is an attack in which malicious software is introduced (e.g., injected) to a system to damage the system and/or to steal information from the system. A phishing attack is an attack in which a deceptive communication (e.g., an electronic mail (a.k.a. email) message) is provided to an entity to trick the entity into revealing sensitive information or into downloading malware. A ransomware attack is an attack that encrypts file(s) and/or system(s) and demands payment (a.k.a. a ransom) for decryption. An XSS attack exploits a vulnerability of a web application to introduce a malicious script into a web page that is viewed by other users.

A security action is an action that is performed in response to (e.g., to address) a security event. For instance, performance of the security action may be triggered by the security event. In an aspect, the security action is configured to increase security of system (e.g., a resource in or utilized by the system). Examples of a security action include but are not limited to isolating a machine, containing (e.g., quarantining) a user, containing an account, containing a file, containing a folder, stopping a virtual machine, and rotating (e.g., changing) a secret (e.g., a password, an application programming interface (API) key, an encryption key, or other credential).

It may be desirable to use an AI model to analyze a communication history of a user who performs a potentially malicious activity to reduce a likelihood of misclassifying the potentially malicious activity (i.e., reduce a likelihood of producing a false negative or a false positive). The communication history of the user may be organization-specific or organization-agnostic. The communication history of the user in context of an organization may provide clues as to whether the potentially malicious activity is indeed malicious. For instance, it may be desirable to determine whether the user has interacted with another user in the organization, has referenced the potentially malicious activity in an interaction, has followed a normal procedure associated with performing the potentially malicious activity, has performed other operations (e.g., other interactions) that provide an acceptable explanation as to why the potentially malicious activity was performed, and so on. Existence of such factors weighs in favor of classifying the potentially malicious activity as non-malicious, whereas absence of such factors weighs in favor of classifying the potentially malicious activity as malicious. By taking into consideration whether any one or more of such factors exist, an appropriate security action may be selected from a plurality of security actions and performed with regard to the potentially malicious activity.

Various approaches are described herein for, among other things, performing a security action based on a communication-based analysis. In an example approach, a security event is detected. The security event is triggered by an operation that is performed by a user in an organization. A first security analysis result is generated by determining whether a communication history of the user includes a communication from the user that initiates an interaction with another user in the organization and/or a communication that is addressed specifically to the user from another user in the organization. A second security analysis result is generated by determining whether the communication history of the user includes a communication from the user that references the operation. A third security analysis result is generated using an AI model. Generating the third security analysis result includes determining whether the communication history of the user includes a communication that provides an explanation of a purpose of the operation that satisfies an explanation criterion. The third security analysis result may be generated by causing the AI model to analyze content of the communication that provides the explanation with regard to the explanation criterion. In response to the security event, execution of an instruction is triggered, which causes a security action to be performed with regard to the operation as a result of a combination of the first, second, and third security analysis results satisfying a security criterion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
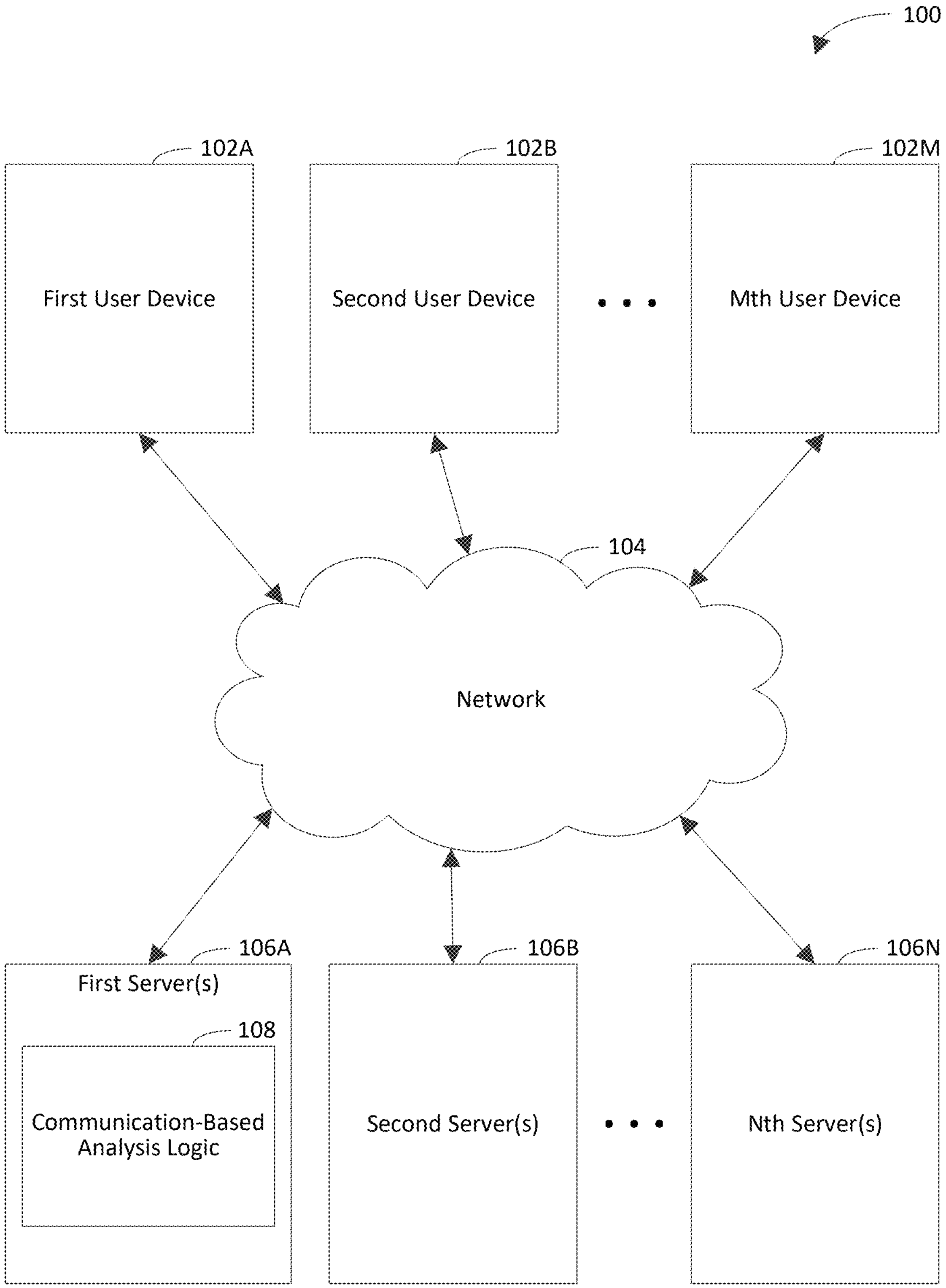
FIG. 1 is a block diagram of an example communication-based analysis system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Artificial intelligence (AI) is intelligence of a machine (e.g., a computing system) and/or code (e.g., software and/or firmware), as opposed to intelligence of a living creature (e.g., a human). An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

A security event is an event that indicates performance of a potentially malicious activity. Examples of a potentially malicious activity include but are not limited to a failed login attempt (i.e. a failure to login to a system), suspicious network activity (e.g., an uncommon pattern of data transfer or an attempt to access sensitive files), an installation of software, and receipt of a phishing email. One example of a security event is receipt of a security alert. A security alert is an alert indicating that a resource is potentially a target of a cyberattack. The security alert may be triggered by a misconfiguration of the resource or a system via which the resource is accessible or by an unexpected, highly impactful, or rare activity being performed with regard to the resource or the system. For instance, a threat actor may exploit a vulnerability of the resource or the system to perpetuate the cyberattack.

Example types of a resource include but are not limited to a hardware resource, a software resource, and a network resource. Examples of a hardware resource include but are not limited to a server, a storage device (e.g., solid-state drive (SSD) or a network-attached storage (NAS)), network equipment (e.g., a router, a switch, or a firewall), and a data center. Examples of a software resource include but are not limited to an operating system, an enterprise application, a database management system (DBMS), a software subscription, a virtual machine, an identity (e.g., an identity of a user of a resource, a software application, or an enterprise), a secret, a process, a file, and a folder. Examples of a network resource include but are not limited to a local area network (LAN), a wide area network (WAN), and an Internet connectivity component (e.g., an Internet service provider (ISP) component or a virtual private network (VPN) component). For instance, an ISP component may provide Internet access, email, web hosting, and domain registration. A VPN component may provide encryption, privacy, remote access, and bypassing of geo-restrictions.

A resource may be a runtime resource. A runtime resource is a resource that is required for a software application to execute. In an aspect, the runtime resource(s) are provided by a runtime environment or a runtime system, which serves as an intermediary between code of the software application and the underlying hardware and operating system associated with the software application. A runtime resource may have any suitable functionality, including but not limited to memory management, input/output management, error handling, debugging, and optimization. Memory management includes allocating and deallocating memory as needed by the software application. Input/output management includes handling data input from input devices (e.g., a keyboard, a keypad, or a microphone) and output to output devices (e.g., a screen, a speaker, or a printer). Error handling includes management of exceptions and errors that occur during execution of the software application. Debugging includes providing tool(s) that enable a user (e.g., a developer) of the software application to find and fix bugs in the software application. Optimization includes increasing performance of the software application (e.g., by optimizing execution of the software application).

Examples of a cyberattack include but are not limited to a denial of service (DoS) attack, a distributed DoS (DDoS) attack, a man-in-the-middle (MITM) attack, a malware attack, a phishing attack, a ransomware attack, and a cross-site scripting (XSS) attack. A DoS attack is an attack that renders a system unable to respond to a legitimate service request by overwhelming resource(s) of the system. A DDoS attack is similar to a DoS attack but involves multiple (e.g., a vast array) malware-infected hosts that are controlled by the threat actor to cause resource exhaustion. An MITM attack is an attack that enables the threat actor to eavesdrop on data exchanged between multiple entities (e.g., people, networks, or computers). A malware attack is an attack in which malicious software is introduced (e.g., injected) to a system to damage the system and/or to steal information from the system. A phishing attack is an attack in which a deceptive communication (e.g., an electronic mail (a.k.a. email) message) is provided to an entity to trick the entity into revealing sensitive information or into downloading malware. A ransomware attack is an attack that encrypts file(s) and/or system(s) and demands payment (a.k.a. a ransom) for decryption. An XSS attack exploits a vulnerability of a web application to introduce a malicious script into a web page that is viewed by other users.

A security action is an action that is performed in response to (e.g., to address) a security event. For instance, performance of the security action may be triggered by the security event. In an aspect, the security action is configured to increase security of system (e.g., a resource in or utilized by the system). Examples of a security action include but are not limited to isolating a machine, containing (e.g., quarantining) a user, containing an account, containing a file, containing a folder, stopping a virtual machine, and rotating (e.g., changing) a secret (e.g., a password, an application programming interface (API) key, an encryption key, or other credential).

It may be desirable to use an AI model to analyze a communication history of a user who performs a potentially malicious activity to reduce a likelihood of misclassifying the potentially malicious activity (i.e., reduce a likelihood of producing a false negative or a false positive). The communication history of the user may be organization-specific or organization-agnostic. The communication history of the user in context of an organization may provide clues as to whether the potentially malicious activity is indeed malicious. For instance, it may be desirable to determine whether the user has interacted with another user in the organization, has referenced the potentially malicious activity in an interaction, has followed a normal procedure associated with performing the potentially malicious activity, has performed other operations (e.g., other interactions) that provide an acceptable explanation as to why the potentially malicious activity was performed, and so on. Existence of such factors weighs in favor of classifying the potentially malicious activity as non-malicious, whereas absence of such factors weighs in favor of classifying the potentially malicious activity as malicious. By taking into consideration whether any one or more of such factors exist, an appropriate security action may be selected from a plurality of security actions and performed with regard to the potentially malicious activity.

Example embodiments described herein are capable of performing a security action based on a communication-based analysis. In an example approach, a security event is detected. The security event is triggered by an operation that is performed by a user in an organization. A first security analysis result is generated by determining whether a communication history of the user includes a communication from the user that initiates an interaction with another user in the organization and/or a communication that is addressed specifically to the user from another user in the organization. A second security analysis result is generated by determining whether the communication history of the user includes a communication from the user that references the operation. A third security analysis result is generated using an AI model. Generating the third security analysis result includes determining whether the communication history of the user includes a communication that provides an explanation of a purpose of the operation that satisfies an explanation criterion. The third security analysis result may be generated by causing the AI model to analyze content of the communication that provides the explanation with regard to the explanation criterion. In response to the security event, execution of an instruction is triggered, which causes a security action to be performed with regard to the operation as a result of a combination of the first, second, and third security analysis results satisfying a security criterion.

Example techniques described herein have a variety of benefits as compared to conventional techniques for performing a security analysis with regard to an operation performed by a user in an organization. For instance, the example techniques are capable of increasing a signal-to-noise ratio (SNR) of a technique for classifying the operation with regard to maliciousness by reducing a likelihood of a false positive or a false negative being produced. The SNR may be increased by analyzing a communication history of the user. The communication history may include content of communications of the user (e.g., communications to the user and/or communications from the user) and/or metadata associated with the communications. Metadata associated with a communication is data, other than content of the communication, that indicates attribute(s) of the communication. For instance, the metadata may indicate an identifier (e.g., name) associated with the user, an IP address of a machine used by the user to perform the operation, a location of the user, and so on.

For instance, a malicious user who performs an operation in context of an organization often does not have any communications (e.g., emails, chats, approval requests, or approval confirmations) with other users in the organization. Absence of such communications may indicate that the operation is malicious. Even if the malicious user does have communications with other users in the organization, for example, to simulate a normal communication pattern (e.g., to obfuscate presence of the malicious user), the malicious user typically does not mention the operation, and the communications typically do not provide an adequate explanation of a purpose of the operation (e.g., interaction with a ticketing system or correct personnel regarding the operation). Absence of a communication that mentions the operation or that otherwise provides an adequate explanation of the purpose of the operation may indicate that the operation is malicious. Conventional anomaly detection techniques do not take into consideration the routine of an organization (e.g., communication patterns between different parties and content) to extract behavior indicators, justification, and approval processes. The example techniques are capable of gathering data from multiple sources and formats and processing the information using multiple layers of logic that utilize different tools, such as rule-based systems, machine learning, and generative AI. By taking into consideration a communication history of the user, an appropriate security action may be selected to address the operation.

The example techniques are capable of increasing security of a resource that is targeted (e.g., accessed) by an operation performed by a user, a computing system that utilizes the resource, and/or a software application that utilizes the resource. In an aspect, the example techniques increase the security by reducing a likelihood of the operation being inaccurately classified as a malicious operation or inaccurately classified as a non-malicious operation. The example techniques are capable of classifying the operation with regard to maliciousness more accurately, precisely, and/or reliably than conventional techniques. For instance, the operation may be classified with a greater statistical accuracy and/or precision than the conventional techniques provide. In an aspect, the security is increased by determining whether the communication history of the user includes a communication from the user that initiates an interaction with another user in the organization, a communication that is addressed specifically to the user from another user in the organization, a communication from the user that references the operation, and/or a communication that provides an explanation of a purpose of the operation that satisfies an explanation criterion. In another aspect, the security is increased by performing a security action based on (e.g., based at least on) the determination.

The example techniques may reduce an amount of time and/or resources (e.g., processor cycles, memory, network bandwidth) that is consumed to classify an operation performed by a user with regard to maliciousness and to determine a security action that is to be performed in response to a security event that is triggered by the operation. For instance, by analyzing the communication history of the user, the example techniques may reduce the amount of time and/or resources that otherwise would have been consumed to obtain information relevant to explaining a purpose of the operation, to determine the purpose, to classify the operation with regard to maliciousness (e.g., based on the purpose), and to determine a security action that is to be performed with regard to the operation (e.g., based on the classification). The example techniques may automate determining the purpose of the operation, classifying the operation with regard to maliciousness, determining the security action that is to be performed with regard to the operation, and/or performing the security action (e.g., by using artificial intelligence to analyze the communication history of the user). By reducing the amount of time and/or resources that is consumed by a computing system to perform any of the above-referenced operations, the efficiency of the computing system may be increased.

By reducing the amount of time that is consumed to classify an operation performed by a user with regard to maliciousness and to determine a security action that is to be performed in response to a security event that is triggered by the operation, the example techniques may increase a user experience and/or efficiency of a security professional who manages security of a resource that is targeted by the operation, a computing system that utilizes the resource, and/or a software application that utilizes the resource. The example techniques may reduce a number of tasks that are manually performed by the security professional by utilizing artificial intelligence and/or by automating determination of the purpose of the operation, classification of the operation with regard to maliciousness, determination of the security action that is to be performed with regard to the operation, and/or performance of the security action. The example techniques may increase a user experience and/or efficiency of an end user who utilizes a resource that is targeted by the operation, a computing system that utilizes the resource, and/or a software application that utilizes the resource. The user experience and/or the efficiency of the security professional and/or the end user may be increased in other ways, as well. For example, the user experience and/or the efficiency may be increased through a more accurate, precise, and/or reliable classification of the operation with regard to maliciousness and/or a more accurate, precise, and/or reliable determination of the security action that is to be performed in response to the security event that is triggered by the operation.

FIG. 1 is a block diagram of an example communication-based analysis system 100 in accordance with an embodiment. Generally speaking, the communication-based analysis system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the communication-based analysis system 100 performs a security action based on a communication-based analysis. Detail regarding techniques for performing a security action based on a communication-based analysis is provided in the following discussion.

As shown in FIG. 1, the communication-based analysis system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the communication-based analysis system 100.

One example type of computer program that may be executed by one or more of the servers 106A-106N is a computer security program. A computer security program is a computer program that provides security with regard to information and/or communications associated with a computing system. For instance, the information associated with the computing system may include information stored on the computing system and/or information accessed (e.g., read)

by the computing system. The communications associated with the computing system may include communications received by the computing system and/or communications provided (e.g., transmitted) by the computing system. An example of a communication is an electronic message. Examples of a computer security program include Bitdefender® security program, developed and distributed by Bitdefender IPR Management Ltd.; Norton® security program, developed and distributed by Gen Digital Inc.; Avast® security program, developed and distributed by Avast Software S.R.O.; McAfee® security program, developed and distributed by McAfee, LLC; and Microsoft Defender® security program, developed and distributed by Microsoft Corporation. It will be recognized that the example techniques described herein may be implemented using a computer security program. For instance, a software product (e.g., a subscription service, a non-subscription service, or a combination thereof) may include the computer security program, and the software product may be configured to perform the example techniques, though the scope of the example embodiments is not limited in this respect.

The computer security program may be a cloud native application protection platform (CNAPP). A CNAPP is an all-in-one platform that unifies security and compliance capabilities to prevent, detect, and respond to cloud security threats. A CNAPP integrates multiple cloud security solutions, which traditionally have been siloed, into a common (e.g., single) user interface. The cloud security solutions may include cloud security posture management (CSPM), multipipeline development and operations (DevOps) security, a cloud workload protection platform (CWPP), cloud infrastructure entitlement management (CIEM), and cloud service network security (CSNS). CSPM provides a connected, prioritized view of potential vulnerabilities and misconfigurations across multi-cloud and hybrid environments. The CSPM continuously assesses overall security posture of a system and provides automated alerts and recommendations about critical issues that could expose the system to data breaches. The CSPM may include automated compliance management and remediation tools to identify and remedy compliance deficiencies. Multipipeline DevOps security provides a central console that enables management of DevOps security across multiple (e.g., all) pipelines. For instance, the multipipeline DevOps security may be used to reduce cloud misconfigurations and to scan new code to keep vulnerabilities therein from reaching a production environment. The multipipeline DevOps security may include infrastructure-as-code scanning tools that analyze configuration files from the earliest stages of development to confirm that new configuration files are compliant with security policies. A CWPP provides real-time detection and response to threats based on up-to-date information regarding multi-cloud workloads (e.g., virtual machines, containers, Kubernetes® pods and/or clusters, databases, storage accounts, network layers, and app services). The CWPP may enable a quick investigation into threats and reduce the attack surface of a system. CIEM centralizes permissions management across a cloud and hybrid footprint, which inhibits (e.g., prevents) accidental or malicious misuse of permissions. CSNS complements the CWPP by protecting cloud infrastructure in real time. The CSNS may include any of a variety of security tools, including but not limited to distributed denial-of-service protection, web application firewalls, transport layer security examination, and load balancing.

A computer security program may be incorporated into a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to a Google Cloud® program developed and distributed by Google Inc.; an Oracle Cloud® program developed and distributed by Oracle Corporation; an Amazon Web Services® program developed and distributed by Amazon.com, Inc.; a Salesforce® program developed and distributed by Salesforce.com, Inc.; an AppSource® program developed and distributed by Microsoft Corporation; an Azure® program developed and distributed by Microsoft Corporation; a GoDaddy® program developed and distributed by GoDaddy.com LLC; and a Rackspace® program developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include communication-based analysis logic 108 for illustrative purposes. The communication-based analysis logic 108 is configured to perform a security action based on a communication-based analysis. In an example implementation, the communication-based analysis logic 108 detects a security event. The security event is triggered by an operation that is performed by a user in an organization. The communication-based analysis logic 108 generates a first security analysis result by determining whether a communication history of the user includes a communication from the user that initiates an interaction with another user in the organization and/or a communication that is addressed specifically to the user from another user in the organization. The communication-based analysis logic 108 generates a second security analysis result by determining whether the communication history of the user includes a communication from the user that references the operation. The communication-based analysis logic 108 generates a third security analysis result using an artificial intelligence (AI) model. Generation of the third security analysis result includes determining whether the communication history of the user includes a communication that provides an explanation of a purpose of the operation that satisfies an explanation criterion. The communication-based analysis logic 108 may generate the third security analysis result using the AI model by causing the AI model to analyze content of the communication that provides the explanation with regard to the explanation criterion. In response to the security event, the communication-based analysis logic 108 triggers execution of an instruction, which causes a security action to be performed with regard to the operation as a result of a combination of the first, second, and third security analysis results satisfying a security criterion.

The communication-based analysis logic 108 may be implemented in various ways to perform a security action based on a communication-based analysis, including being implemented in hardware, software, firmware, or any combination thereof. For example, the communication-based analysis logic 108 may be implemented as computer program code configured to be executed in one or more processors. In another example, at least a portion of the communication-based analysis logic 108 may be implemented as hardware logic/electrical circuitry. For instance, at least a portion of the communication-based analysis logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the communication-based analysis logic 108 may be (or may be included in) a computer security program and/or a cloud computing program, though the scope of the example embodiments is not limited in this respect.

The communication-based analysis logic 108 is shown to be incorporated in the first server(s) 106A for illustrative purposes and is not intended to be limiting. It will be recognized that the communication-based analysis logic 108 (or any portion(s) thereof) may be incorporated in any one or more of the servers 106A-106N, any one or more of the user devices 102A-102M, or any combination thereof. For example, client-side aspects of the communication-based analysis logic 108 may be incorporated in one or more of the user devices 102A-102M, and server-side aspects of communication-based analysis logic 108 may be incorporated in one or more of the servers 106A-106N.

FIGS. 2-5 depict flowcharts 200, 300, 400, and 500 of example methods for performing a security action based on a communication-based analysis in accordance with embodiments. Flowcharts 200, 300, 400, and 500 may be performed by the first server(s) 106A shown in FIG. 1, for example. For illustrative purposes, flowcharts 200, 300, 400, and 500 are described with respect to a computing system 600 shown in FIG. 6, which is an example implementation of the first server(s) 106A. As shown in FIG. 6, the computing system 600 includes communication-based analysis logic 608 and a store 610. The communication-based analysis logic 608 includes communication analysis logic 612, reference analysis logic 614, explanation analysis logic 616, an artificial intelligence (AI) model 618, and security action logic 620. The store 610 may be any suitable type of store. One type of store is a database. For instance, the store 610 may be a relational database, an entity-relationship database, an object database, an object relational database, an extensible markup language (XML) database, etc. The store 610 is shown to store a communication history 636 of a user for non-limiting, illustrative purposes. Further structural and operational embodiments will be apparent to persons skilled in the relevant art(s) based on the discussion regarding flowcharts 200, 300, 400, and 500.

Figure 2:
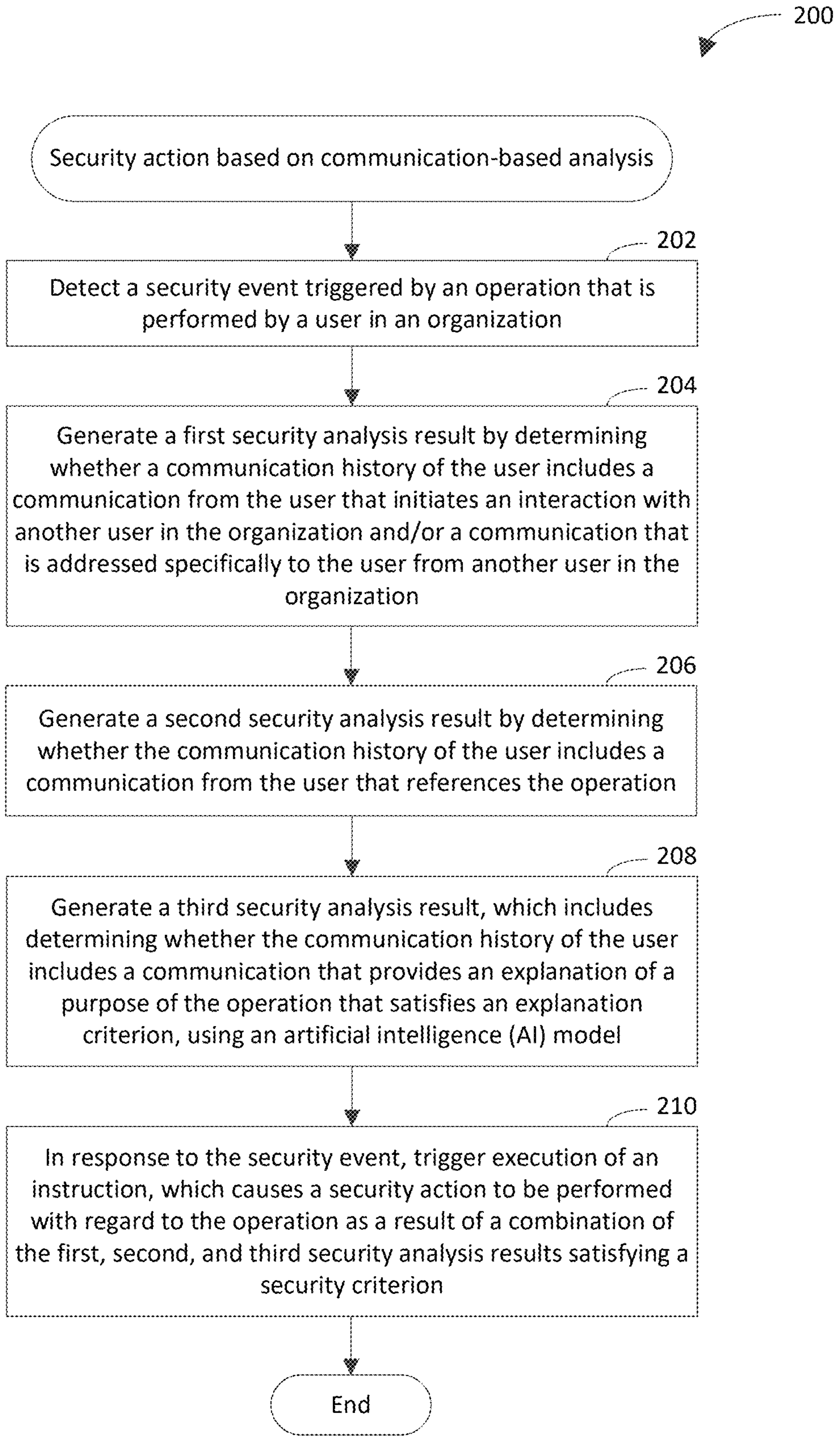
FIGS. 2-5 depict flowcharts of example methods for performing a security action based on a communication-based analysis in accordance with embodiments.

As shown in FIG. 2, the method of flowchart 200 begins at step 202. In step 202, a security event is detected. The security event is triggered by an operation that is performed by a user in an organization. In an aspect, the security event includes receipt of a security alert. In another aspect, the security event is triggered as a result of the operation being a rarely performed operation (i.e., an operation having a likelihood of occurring that is less than a likelihood threshold), an operation having a priority (e.g., importance or security risk) that is greater than a priority threshold, or an operation performed in an uncommon (e.g., statistically unlikely) context (i.e., a context having a likelihood that is less than a likelihood threshold). For instance, the context may be deemed uncommon as a result of a likelihood of the operation being performed by the user, a likelihood of the user having an identified location, or a likelihood of a machine that is used to perform the operation having an identified IP address is less than a likelihood threshold. For instance, the security event may indicate that the user is potentially a compromised user (e.g., compromised by an entity that is external to the organization) or potentially a malicious insider in the organization. In an example implementation, the security action logic 620 detects a security event 622. The security event 622 is triggered by the operation that is performed by the user in the organization.

At step 204, a first security analysis result is generated by determining whether a communication history of the user includes a communication from the user that initiates an interaction with another user in the organization and/or a communication that is addressed specifically to the user (e.g., is directly addressed to the user and/or is individually addressed to the user) from another user in the organization. For example, a communication may be addressed specifically to the user by being addressed to a unique identifier (e.g., an alias, such as an email address) of the user (e.g., using an identifier that uniquely identifies the user). For instance, a communication may be addressed specifically to the user using an alias that is unique to the user, rather than an alias of a group that includes the user. In a weighing aspect, the communication history including a communication from the user initiating an interaction with another user in the organization or including a communication that is addressed specifically to the user from another user in the organization weighs in favor of classifying the operation as non-malicious. In accordance with the weighing aspect, the communication history not including such communication(s) weighs in favor of classifying the operation as malicious. In further accordance with the weighing aspect, the first security analysis result indicates a first likelihood (e.g., statistical probability) that the operation is malicious. In an example implementation, the communication analysis logic 612 generates a first security analysis result 642 by determining whether the communication history 636 of the user includes a communication from the user that initiates an interaction with another user in the organization and/or a communication that is addressed specifically to the user from another user in the organization. In an aspect, the first security analysis result 624 indicates (e.g., specifies) whether the communication history 636 includes a communication from the user that initiates an interaction with another user in the organization and/or a communication that is addressed specifically to the user from another user in the organization.

In an example embodiment, generating the first security analysis result at step 204 includes determining a number of communications in the communication history that are from the user and that initiate an interaction with another user in the organization and/or a number of communications in the communication history that are addressed specifically to the user from another user in the organization. In an aspect, the first security analysis result indicates the number of communications in the communication history that are from the user and that initiate an interaction with another user in the organization and/or the number of communications in the communication history that are addressed specifically to the user from another user in the organization.

At step 206, a second security analysis result is generated by determining whether the communication history of the user includes a communication from the user that references the operation. A communication references an operation by mentioning (e.g., identifying) the operation. For instance, the communication may mention an occurrence (e.g., a past or future occurrence) of the operation. In an aspect, step 206 includes determining whether the communication history of the user includes a communication from the user that notifies another user (e.g., multiple other users) in the organization that the operation has occurred or that the operation is going to occur. In accordance with this aspect, the communication may mention an occurrence of the operation by providing a notification that the operation has occurred or is going to occur. In the weighing aspect, the communication history including a communication from the user that references the operation weighs in favor of classifying the operation as non-malicious. In accordance with the weighing aspect, the communication history not including a communication from the user that references the operation weighs in favor of classifying the operation as malicious. In further accordance with the weighing aspect, the second security analysis result indicates a second likelihood that the operation is malicious. In an example implementation, the reference analysis logic 614 generates a second security analysis result 644 by determining whether the communication history 636 of the user includes a communication from the user that references the operation. In an aspect, the second security analysis result 644 indicates whether the communication history 636 includes a communication from the user that references the operation.

In an example embodiment, generating the second security analysis result at step 206 includes determining a number of communications in the communication history that are from the user and that reference the operation. In an aspect, the second security analysis result indicates the number of communications in the communication history that are from the user and that reference the operation. Communications reference an operation by mentioning (e.g., identifying) the operation. For example, each of the communications may mention an occurrence (e.g., a past or future occurrence) of the operation. In accordance with this example, each of the communications may reference the operation by notifying other user(s) in the organization that the operation has occurred or that the operation is going to occur.

At step 208, a third security analysis result is generated using an AI model. Generating the third security analysis result includes determining whether the communication history of the user includes a communication that provides an explanation of a purpose of the operation that satisfies an explanation criterion. The third security analysis result may be generated using the AI model by causing (e.g., automatically causing) the AI model to analyze content of the communication that provides the explanation with regard to the explanation criterion. An explanation criterion is a threshold (e.g., minimum) persuasiveness of an explanation of a purpose of an operation as to non-maliciousness of the operation. The persuasiveness of the explanation corresponds to a likelihood that the operation is non-malicious. For instance, the explanation criterion being set to N % establishes a requirement that the explanation is at least N % persuasive, meaning that the likelihood of the operation being non-malicious is at least N %, where N is a positive number between 0 and 100.

In the weighing aspect, the communication history including a communication that provides an explanation of a purpose of the operation that satisfies the explanation criterion weighs in favor of classifying the operation as non-malicious. In accordance with the weighing aspect, the communication history not including a communication that provides an explanation of a purpose of the operation that satisfies the explanation criterion weighs in favor of classifying the operation as malicious. In further accordance with the weighing aspect, the third security analysis result indicates a third likelihood that the operation is malicious.

In an example implementation, the explanation analysis logic 616 generates a third security analysis result 646 using the AI model 618. Generation of the third security analysis result 646 includes determining whether the communication history 636 of the user includes a communication that provides an explanation of a purpose of the operation that satisfies an explanation criterion 624. The explanation analysis logic 616 may generate the third security analysis result 646 using the AI model 618 by causing the AI model 618 to analyze the content of the communication with regard to the explanation criterion 624. In an aspect, the third security analysis result 646 indicates whether the communication history 636 includes a communication that provides an explanation of the purpose of the operation that satisfies the explanation criterion 624.

In an example user-generated communication embodiment, generating the third security analysis result at step 208 includes determining whether a value of an attribute of a user-generated communication in the communication history of the user corresponds to a reference value of the attribute of a reference user-generated communication. The user-generated communication is generated by the user and references the operation. The reference user-generated communication references a historical operation that corresponds to the operation performed by the user.

In an aspect of the user-generated communication embodiment, the historical operation is known to be non-malicious. In another aspect, the reference user-generated communication is associated with a known cyberattack or a known malicious entity. In yet another aspect, the historical operation is known to be non-malicious. In still another aspect, a determination that the value of the attribute of the user-generated communication in the communication history of the user corresponds to the reference value of the attribute of the reference user-generated communication indicates that the operation conforms to an approval process (e.g., an established or pre-defined approval process) for approving performance of the operation. For instance, the value of the attribute of the user-generated communication corresponding to the reference value of the attribute of the reference user-generated communication may indicate that the user obtained approval from a manager to perform the operation. In the weighing aspect, the operation conforming to the approval process weighs in favor of classifying the operation as non-malicious. In accordance with the weighing aspect, the operation not conforming to the approval process weighs in favor of classifying the operation as malicious.

Each of the user-generated communication and the reference user-generated communication may be an electronic mail (email) message, an instant message, a short message service (SMS) message, a chat (e.g., a Microsoft Teams® message), an information technology (IT) support ticket, or a file. For instance the file may be a Word™ or Excel® file (e.g., that lists names of persons who are to perform various operations). For instance, the IT support ticket may be generated by a ticketing tool or ticketing platform, such as an Azure DevOps® (ADO) development tool suite, developed and distributed by Microsoft Corporation; a GitHub® platform, developed and distributed by GitHub, Inc., which is now a subsidiary of Microsoft Corporation; and a Slack® platform, developed and distributed by Slack Technologies, Inc., which is now a subsidiary of Salesforce, Inc. The IT support ticket may be received (e.g., accepted) by the user. Examples of an attribute of a user-generated communication include but are not limited to a dialect, a sender, a recipient, a role of the sender, and a role of the recipient, and a topic of the user-generated communication. For instance, the user-generated communication may notify or request approval from an entity (e.g., a person, a role, a manager, a security professional, an operations representative, or a network administrator) to perform the operation.

In another aspect of the user-generated communication embodiment, the reference value of the attribute conforms to an established protocol that defines a manner in which the operation is to be performed. In accordance with this aspect, determining whether the value of the attribute of the user-generated communication corresponds to the reference value includes determining whether the value of the attribute of the user-generated communication conforms to the established protocol. In an example, the established protocol is a pre-defined protocol. In another example, the established protocol is defined by a ticketing tool or a ticketing platform.

In an example system-generated communication embodiment, generating the third security analysis result at step 208 includes determining whether a value of an attribute of a system-generated communication corresponds to a reference value of the attribute of a reference system-generated communication. The system-generated communication is generated by a system utilized by the user and references the operation. The reference system-generated communication references a historical operation that corresponds to the operation performed by the user.

In an aspect of the system-generated communication embodiment, a determination that the value of the attribute of the system-generated communication corresponds to the reference value of the attribute of the reference system-generated communication indicates that the operation conforms to the approval process for approving performance of the operation. For instance, the value of the attribute of the system-generated communication corresponding to the reference value of the attribute of the reference system-generated communication may indicate that, prior to performing the operation, the user obtained elevated permission(s) and security group owners were notified in compliance with the approval process.

Each of the system-generated communication and the reference system-generated communication may be an electronic mail (email) message, an instant message, a short message service (SMS) message, a chat (e.g., a Microsoft Teams® message), an information technology (IT) support ticket, or a file. For instance the file may be a Word™ or Excel® file (e.g., that lists names of persons who are to perform various operations). Examples of an attribute of a system-generated communication include but are not limited to a dialect, a sender, a recipient, a role of the sender, and a role of the recipient, and a topic of the system-generated communication. For instance, the system-generated communication may notify or request approval from an entity to perform the operation.

In another aspect of the system-generated communication embodiment, the reference value of the attribute conforms to an established protocol that defines a manner in which the operation is to be performed. In accordance with this aspect, determining whether the value of the attribute of the system-generated communication corresponds to the reference value includes determining whether the value of the attribute of the system-generated communication conforms to the established protocol.

In an example explanation-providing communication embodiment, generating the third security analysis result at step 208 includes determining whether a communication provides the explanation that satisfies the explanation criterion by determining whether the communication is a request, which is received by the user, to perform the operation and further by determining whether the request corresponds to a business role of the user. Examples of a business role include but are not limited to an engineer, a software developer, a project manager, a product manager, a security professional, a database administrator, a data analyst, a development and operations (DevOps) engineer, a customer service representative, and a sales representative. In an aspect, a determination is made whether the communication that provides the explanation is a request that is received by the user to perform the operation and whether the request corresponds to the business role of the user by analyzing service-related communications (e.g., IT support tickets) associated with a service desk of the organization. A service desk of an organization is a centralized support hub in the organization that serves as a primary point of contact between an IT department and users in the organization. For instance, the users may include employees, customers, and business partners. In the weighing aspect, the communication history including a communication that is a request, which is received by the user, to perform the operation and the request corresponding to a business role of the user weighs in favor of classifying the operation as non-malicious. In accordance with the weighing aspect, the communication history not including such a communication weighs in favor of classifying the operation as malicious.

At step 210, in response to the security event, execution of an instruction (e.g., a computer-readable instruction) is triggered (e.g., automatically triggered), which causes a security action to be performed with regard to the operation as a result of a combination of the first, second, and third security analysis results satisfying a security criterion. A security criterion is a criterion that, when satisfied, triggers performance of a security action. For example, a first security action may be performed in response to satisfaction of a first security criterion; a second security action may be performed in response to satisfaction of a second security criterion, and so on. In accordance with this example, the first criterion and the second criterion may be mutually exclusive, though the example embodiments are not limited in this respect. In an aspect, the security criterion establishes a threshold (e.g., minimum) likelihood of the operation being malicious that triggers performance of the security action. In accordance with this aspect, the security action is performed as a result of a likelihood of the operation being malicious being greater than or equal to the threshold likelihood. In further accordance with this aspect, the likelihood of the operation being malicious is based on (e.g., derived from) the combination of the first, second, and third security analysis results. For instance, the first security analysis result indicates a first likelihood that the operation is malicious. The second security analysis result indicates a second likelihood that the operation is malicious. The third security analysis result indicates a third likelihood that the operation is malicious. The combination of the first, second, and third security analysis results indicates a combined likelihood that the operation is malicious. For example, the combination of the first, second, and third security analysis results may be an average, weighted average, or median of the first, second, and third security analysis results.

A security action that is performed with regard to an operation is an action that is configured to increase security of a resource that is targeted (e.g., accessed) by the operation, a computing system that utilizes the resource, and/or a software application that utilizes the resource. In an aspect, the software application is a line-of-business (LoB) application. A LoB application is an application that is configured to support and automate core function(s) and process(es) of a particular business or industry. Examples of a core function include but are not limited to customer relationship management (CRM), enterprise resource planning (ERP), human resources (HR) management, inventory management, accounting and financial management, project management, supply chain management, healthcare management, and retail point-of-sale (POS). CRM includes management of customer interactions, sales processes, and customer service. ERP includes integration of multiple business processes (e.g., finance, HR, supply chain, and manufacturing). HR management includes management of employee records, payroll recruitment, and employee performance. Inventory management includes tracking inventory levels, orders, sales, and deliveries. Accounting and financial management includes management of financial transactions, budgeting, and financial reporting. Project management includes planning, executing, and monitoring projects to facilitate completion of the projects within a defined period of time and within a defined budget. Supply chain management includes overseeing a flow of goods and services from suppliers to customers. Healthcare management includes management of patient records, appointments, billing, and compliance in a healthcare environment. Retail POS includes processing sales transactions, managing inventory, and handling customer loyalty programs.

In the weighing aspect, the security action is performed with regard to the operation as a result of a combination (e.g., sum, average, or median) of the first, second, and third likelihoods, which are indicated by the respective first, second, and third security analysis results, satisfying the security criterion. In an example, weights are applied to the first, second, and third likelihoods to provide weighted likelihoods. For instance, a first weight may be applied to the first likelihood to provide a first weighted likelihood; a second weight may be applied to the second likelihood to provide a second weighted likelihood; and a third weight may be applied to the third likelihood to provide a third weighted likelihood. In an example implementation, the first weight is greater than the second weight, and the second weight is greater than the third weight. In another example implementation, the first weight is less than the second weight, and the second weight is less than the third weight. The security action may be performed with regard to the operation as a result of a combination of the first, second, and third weighted likelihoods satisfying the security criterion (e.g., as a result of the combination being greater than or equal to a threshold). It will be recognized that the combination of the first, second, and third weighted likelihoods may be normalized (e.g., to be within a range from 0% to 100%).

In another aspect, causing the security action to be performed at step 210 includes selecting the security action from a plurality of security actions, which are available to be performed, as a result of the combination of the first, second, and third security analysis results satisfying the security criterion.

In yet another aspect, the security action includes providing a security alert to a security professional, an end user, or to an owner of the resource, the computing system, or the software application. For example, the security alert may indicate that the operation has been performed or that the user is potentially malicious. In another example, the security alert may indicate (e.g., specify or describe) step(s) that are capable of being performed to mitigate (e.g., undo a result of) the operation. In another aspect, the security action includes blocking (e.g., preventing or inhibiting) completion of a process that is initiated by performance of the operation. In yet another aspect, the security action includes increasing a priority (e.g., severity) of a pre-existing security alert. In still another aspect, the security action includes blocking access of the user to the resource that is targeted by the operation and/or another resource (e.g., a resource that is accessible to the resource that is targeted by the operation), a computing system that utilizes any such resource(s), and/or a software application that utilizes any such resource(s). In other aspects, the security action includes turning off a virtual machine; blocking a virtual machine from accessing the Internet; rotating, executing, deleting, or encrypting a secret; or changing permissions (e.g., read write, execute, full control) of the user or resource(s) (e.g., the resource that is targeted by the operation).

In an example implementation, in response to the security event 622, the security action logic 620 triggers execution of the instruction, which causes a security action 640 to be performed with regard to the operation as a result of a combination of the first security analysis result 642, the second security analysis result 644, and the third security analysis result 646 satisfying a security criterion 630.

In some example embodiments, the explanation analysis logic 616 provides an AI prompt together with contextual information as inputs to the AI model 618, which causes the AI model 618 to determine whether the communication history 636 of the user includes a communication that provides an explanation of a purpose of the operation that satisfies the explanation criterion 624. The AI prompt requests a determination whether the communication history 636 includes a communication that provides an explanation of a purpose of the operation that satisfies the explanation criterion 624. The contextual information includes context regarding the AI prompt. The contextual information includes communication information 632 and criterion information 634. The communication information 632 includes the communication history 636 or a summary of the communication history 636. The criterion information 634 indicates (e.g., specifies or describes) the explanation criterion 624. In an aspect, the AI model 618 generates the third security analysis result 646 by analyzing the AI prompt and the contextual information. In accordance with this aspect, by analyzing the AI prompt and the contextual information, the AI model 618 determines relationships between attributes of communications in the communication history 636 and the explanation criterion 624.

In an example embodiment, the explanation analysis logic 616 causes (e.g., triggers) the AI model 618 to analyze (e.g., develop and/or refine an understanding of) the AI prompt, the contextual information (including the communication information 632 and the criterion information 634), relationships between any of the foregoing, and confidences in those relationships. For example, the explanation analysis logic 616 may cause the AI model 618 to compare attributes of the AI prompt and the contextual information (including the communication information 632 and the criterion information 634) using artificial intelligence to generate the third security analysis result 646. The contextual information may further include sample AI prompt(s), sample communication information (e.g., sample communications or summaries thereof), and sample criterion information.

In some example embodiments, the AI model 618 includes a neural network that uses the artificial intelligence to determine (e.g., predict) relationships between the AI prompt and the contextual information (including the communication information 632 and the criterion information 634) and confidences in the relationships. The neural network uses those relationships to generate the third security analysis result 646. For example, attributes of the AI prompt, the contextual information, and potentially example AI prompt(s), example communication information, and example criterion information may be compared to determine similarities and differences between those attributes. In accordance with this example, the neural network may use those similarities and differences to generate the third security analysis result 646.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the explanation analysis logic 616 employs a feed forward neural network to train the AI model 618, which is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a purpose explanation model (e.g., to determine whether a communication history of a user includes a communication that provides an explanation of a purpose of an operation performed by the user that satisfies an explanation criterion) by utilizing information, such as AI prompts, contextual information (including the communication information 632 and the criterion information 634), relationships between any of the foregoing, and AI-based confidences that are derived therefrom.

In example embodiments, the explanation analysis logic 616 includes training logic, and the AI model 618 includes inference logic. The training logic is configured to train an AI algorithm that the inference logic uses to determine (e.g., infer) the AI-based confidences. For instance, the training logic may provide sample AI prompts and sample contextual information (e.g., including sample communication information and sample criterion information) as inputs to the AI algorithm to train the AI algorithm. The sample data may be labeled. The AI algorithm may be configured to derive relationships between the features (e.g., the AI prompt and the contextual information, including the communication information 632 and the criterion information 634) and the resulting AI-based confidences. The inference logic is configured to utilize the AI algorithm, which is trained by the training logic, to determine the AI-based confidence when the features are provided as inputs to the algorithm.

In an example embodiment, the AI model 618 includes (e.g., is) a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMA®) model, developed and distributed by Meta Platforms Inc.; a language model for dialogue applications (a.k.a., LaMDA®) model and a Gemini® model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In another example embodiment, the AI model 618 includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMA® model, developed and distributed by Meta Platforms Inc.; and a pathways language model (a.k.a., PaLM®) model and the Gemini® model, developed and distributed by Google LLC.

In yet another example embodiment, the AI model 618 includes an embedding model. An embedding model is an AI model that uses deep learning to convert data into vectors, which represent attributes of the data, and that compares at least a subset of the vectors to determine an extent to which the vectors that are included in the subset are similar. For instance, each vector may represent a semantic meaning of one or more communications in the communication history 636 or the explanation criterion 624.

In still another example embodiment, the AI model 618 includes multiple types of AI models. Weights may be applied to the responses generated by the respective types of AI models. For example, the AI model 618 may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. The AI model 618 may combine (e.g., sum) the first weighted response and the second weighted response to generate a response of the AI model 618 (e.g., the third security analysis result 646).

In an embedding model embodiment, the AI model 618 generates the third security analysis result 644 using an embedding model. In an aspect of this embodiment, the embedding model is an encoder-only model. One example of an encoder-only model is the bidirectional encoder representations from transformers (BERT™) model, which is developed and distributed by Google LLC. In another aspect of this embodiment, the embedding model is a decoder-only model. In yet another aspect of this embodiment, the embedding model is an encoder-decoder model. One example of an encoder-decoder model is the FLAN-T5™ model, which is developed and distributed by Google LLC.

In another example embodiment, the AI model 618 determines the relationships between communications in the communication history 636 (e.g., attributes of the communications) and the explanation criterion 624 based on distances between embeddings (a.k.a. tokens) of the communications and an embedding of the explanation criterion 624. An embedding is a numerical representation of data (e.g., one or more of the communications in the communication history 636 or a description or summary thereof or the explanation criterion 624 or a description or summary thereof). For instance, the embedding may be generated by converting the data (e.g., text) into a vector (e.g., an array of numbers). In an aspect, the embedding represents the meaning and the context of the data. In accordance with this aspect, the distance between a first embedding of communication(s) in the communication history 636 and a second embedding of the explanation criterion 624 corresponds to a strength of a relationship (e.g., similarity) between the communication(s) and the explanation criterion 624. For instance, the distance being relatively shorter indicates that the communication(s) correspond to the explanation criterion 624 to a relatively greater extent, whereas the distance being relatively longer indicates that the communication(s) correspond to the explanation criterion 624 to a relatively lesser extent.

The distance between a first embedding and a second embedding may be any suitable type of distance, including but not limited to a Euclidian distance (a.k.a. Pythagorean distance), a Manhattan distance, or a Cosine distance. A Euclidian distance between two vectors is the length of the shortest line between the vectors. For example, the Euclidian distance, $D_E$, between two 2-dimensional vectors (a, b) and (x, y) may be represented as $D_E$=[(a−x)^2+(b−y)^2]^(½). In another example, the Euclidian distance, $D_E$, between two 3-dimensional vectors (a, b, c) and (x, y, z) may be represented as $D_E$=[(a−x)^2+(b−y)^2+(c−z)^2]^(½). A Manhattan distance between two vectors is a sum of absolute differences between corresponding components of the vectors. For example, the Manhattan distance, $D_M$, between two 2-dimensional vectors (a, b) and (x, y) may be represented as $D_M$=Abs(a−x)+Abs(b−y). In another example, the Manhattan distance, $D_M$, between two 3-dimensional vectors (a, b, c) and (x, y, z) may be represented as $D_M$=Abs(a−x)+Abs(b−y)+Abs(c−z). A Cosine distance between two vectors is equal to a dot product of the vectors divided by a product of the magnitudes of the vectors. Accordingly, the Cosine distance, $D_C$, between vectors X and Y may be represented as $D_C$=(X·Y)/||X||*||Y||).

An embedding that represents multiple communications in the communication history 636 may be a combination (e.g., average or median) of respective embeddings of the communications.

The AI model 316 may define subsets of the communications in the communication history 636 using a clustering algorithm or a gradient algorithm. In an example clustering embodiment, the AI model 618 clusters the subsets of the communications into respective clusters by analyzing embeddings that represent the communications using a clustering algorithm. The clustering algorithm may be density-based, distribution-based, centroid-based, or hierarchical-based. A density-based clustering algorithm clusters data points (e.g., the subsets of the communications), which are included in an area having a relatively high concentration of data points that is surrounded by area(s) having a relatively low concentration of data points, into a cluster. A distribution-based clustering algorithm clusters data points into clusters based on a distance of each data point to the center of each of multiple clusters, such that the data point is included in the cluster having a center that is closer to the data point than the center of each other cluster. A centroid-based clustering algorithm clusters data points into clusters based on a squared distance of each data point from each of multiple centroids in the data, such that the data point is included in the cluster corresponding to the centroid with the shortest squared distance to the data point. A hierarchical-based clustering algorithm clusters data points based on which of multiple hierarchical levels of a hierarchy includes the data points. For example, data points corresponding to a first hierarchical level are clustered into a first cluster; data points corresponding to a second hierarchical level are clustered into a second cluster, and so on.

In an aspect, the subsets of the communications in the communication history 636 are clustered into respective clusters as a result of the subsets of the communications corresponding to respective attributes. For example, a first subset of the communications may be clustered into a first cluster as a result of the first subset of the communications sharing a first attribute. A second subset of the communications may be clustered into a second cluster as a result of the second subset of the communications sharing a second attribute, and so on. In another example, each cluster may consist of a designated (e.g., fixed) number (e.g., 2, 3, or 10) of the communications.

In an aspect of the clustering embodiment, the clustering algorithm is a K-means clustering algorithm. The K-means clustering algorithm is an unsupervised learning centroid-based clustering algorithm. In an aspect, the K-means clustering algorithm attempts to minimize the variance of data points within each cluster.

In another aspect of the clustering embodiment, the clustering algorithm is a density-based spatial clustering of applications with noise (DBSCAN) clustering algorithm. As indicated by its name, the DBSCAN clustering algorithm is a density-based clustering algorithm. The DBSCAN clustering algorithm defines arbitrarily shaped clusters based on density of data points in regions that are separated by areas of low-density.

Other examples of a clustering algorithm include but are not limited to a Gaussian mixture clustering algorithm, a balance iterative reducing and clustering using hierarchies (BIRCH) clustering algorithm, an affinity propagation clustering algorithm, a mean-shifting clustering algorithm, an ordering points to identify the clustering structure (OPTICS) clustering algorithm, and an agglomerative hierarchy clustering algorithm.

Figure 3:
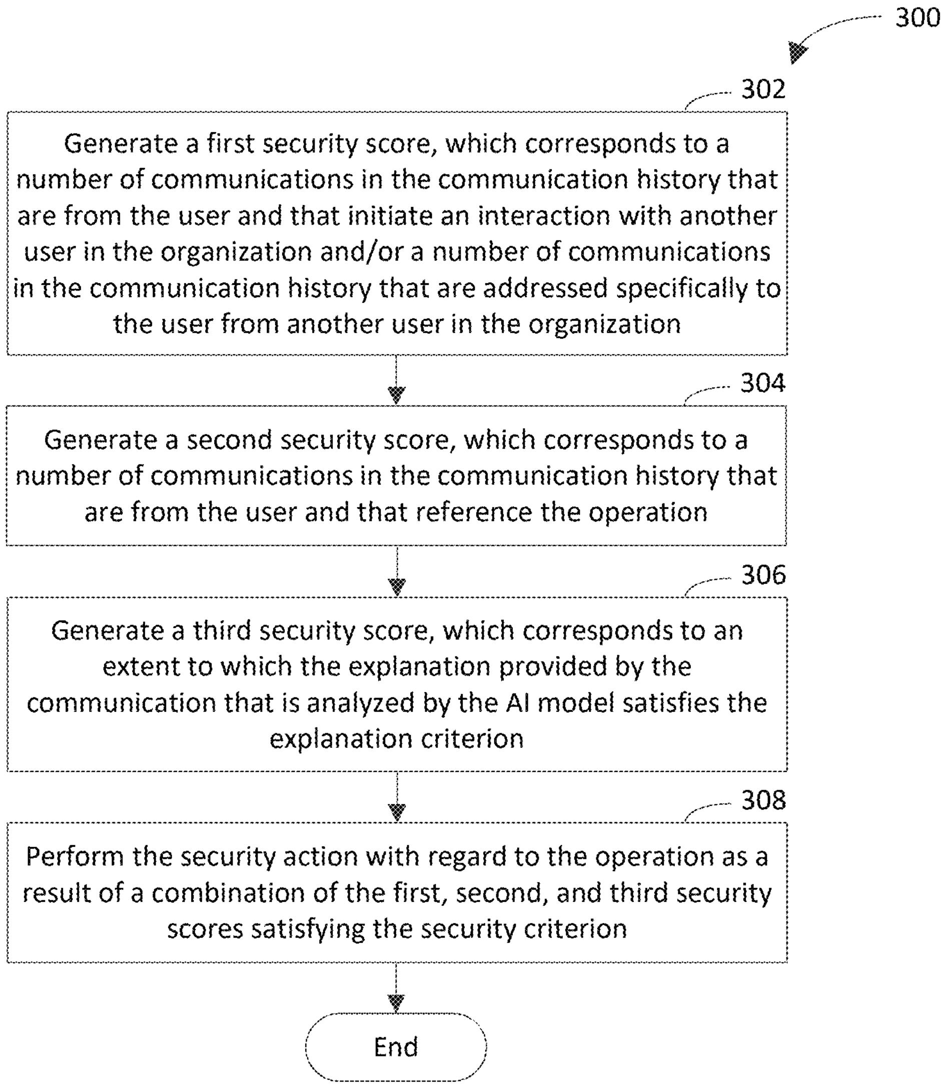

In an example embodiment, the method of flowchart 200 includes one or more of the steps shown in flowchart 300 of FIG. 3. As shown in FIG. 3, the method of flowchart 300 begins at step 302. In step 302, a first security score is generated. The first security score corresponds to (e.g., is calculated based on) a number of communications in the communication history that are from the user and that initiate an interaction with another user in the organization and/or a number of communications in the communication history that are addressed specifically to the user from another user in the organization. In an aspect, step 204 shown in FIG. 2 includes step 302. In an example implementation, the communication analysis logic 612 generates a first security score 652. The first security score 652 corresponds to a number of communications in the communication history 636 that are from the user and that initiate an interaction with another user in the organization and/or a number of communications in the communication history 636 that are addressed specifically to the user from another user in the organization. In an aspect, the first security analysis result 642 includes the first security score 652.

At step 304, a second security score is generated. The second security score corresponds to a number of communications in the communication history that are from the user and that reference the operation. In an aspect, step 206 shown in FIG. 2 includes step 304. In an example implementation, the reference analysis logic 614 generates a second security score 654. The second security score 654 corresponds to a number of communications in the communication history that are from the user and that reference the operation. In an aspect, the second security analysis result 644 includes the second security score 654.

At step 306, a third security score is generated. The third security score corresponds to an extent to which the explanation provided by the communication that is analyzed by the AI model satisfies the explanation criterion. In an aspect, step 208 shown in FIG. 2 includes step 306. In an example implementation, the explanation analysis logic 616 generates a third security score 656. The third security score 656 corresponds to an extent to which the explanation provided by the communication that is analyzed by the AI model 618 satisfies the explanation criterion 624. In an aspect, the third security analysis result 646 includes the third security score 656.

At step 308, the security action is performed with regard to the operation as a result of a combination of the first, second, and third security scores satisfying the security criterion. In an aspect, step 210 shown in FIG. 2 includes step 308. In an example implementation, the security action logic 620 performs the security action 640 with regard to the operation (e.g., using the AI model 618) as a result of a combination of the first security score 652, the second security score 654, and the third security score 656 satisfying the security criterion 630.

Figure 4:
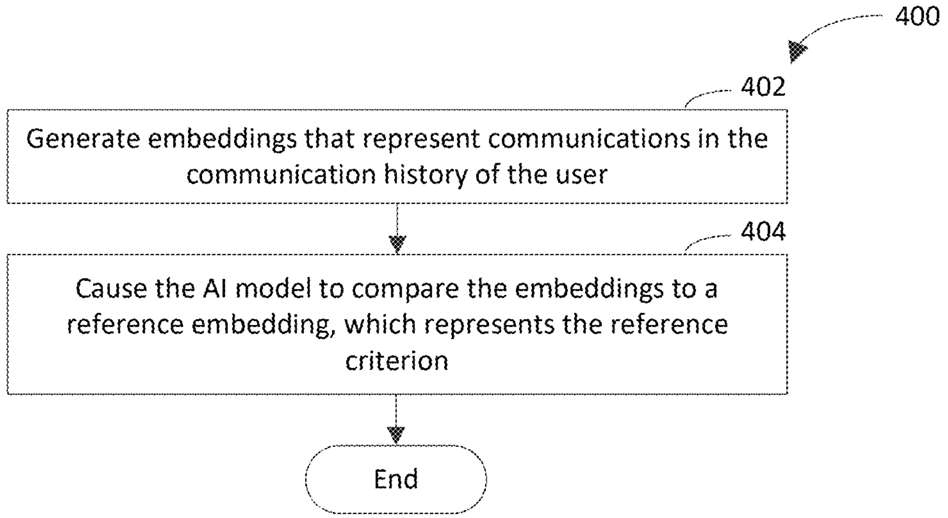

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes one or more of the steps shown in flowchart 400 of FIG. 4. As shown in FIG. 4, the method of flowchart 400 begins at step 402. In step 402, embeddings that represent communications in the communication history of the user are generated. In an example implementation, the AI model 618 generates embeddings 626 that represent communications in the communication history 636 of the user. For instance, the explanation analysis logic 616 may cause the AI model 636 to generate the embeddings 626. In an aspect, the explanation analysis logic 616 causes the AI model 636 to generate the embeddings 626 by providing an AI prompt together with contextual information to the AI model 618. The contextual information includes context regarding the AI prompt. In accordance with this aspect, the AI prompt requests generation of the embeddings 626. In further accordance with this aspect, the contextual information includes the communication information 632.

At step 404, the AI model is caused to compare the embeddings, which represent the communications in the communication history of the user, to a reference embedding, which represents the explanation criterion. In an aspect, step 208 shown in FIG. 2 includes step 404. In an example implementation, the explanation analysis logic 616 causes the AI model 618 to compare the embeddings 626, which represent the communications in the communication history 636 of the user, to a reference embedding 628, which represents the explanation criterion 624. In an aspect, the explanation analysis logic 616 causes the AI model 636 to compare the embeddings 626 to the reference embedding 628 by providing an AI prompt together with contextual information to the AI model 618. In accordance with this aspect, the AI prompt requests a comparison of the embeddings 626 to the reference embedding 628 (e.g., to determine extents to which the embeddings 626 correspond to the reference embedding 628).

In accordance with the embodiment of FIG. 4, an extent to which an embedding of the communication that provides the explanation of the purpose of the operation corresponds to the reference embedding indicates whether the explanation satisfies the explanation criterion. In an aspect, the third security analysis result 646 indicates the extent to which the embedding of the communication that provides the explanation of the purpose of the operation corresponds to the reference embedding 628. In another aspect, the extent indicates whether the explanation satisfies the explanation criterion 624.

Figure 5:
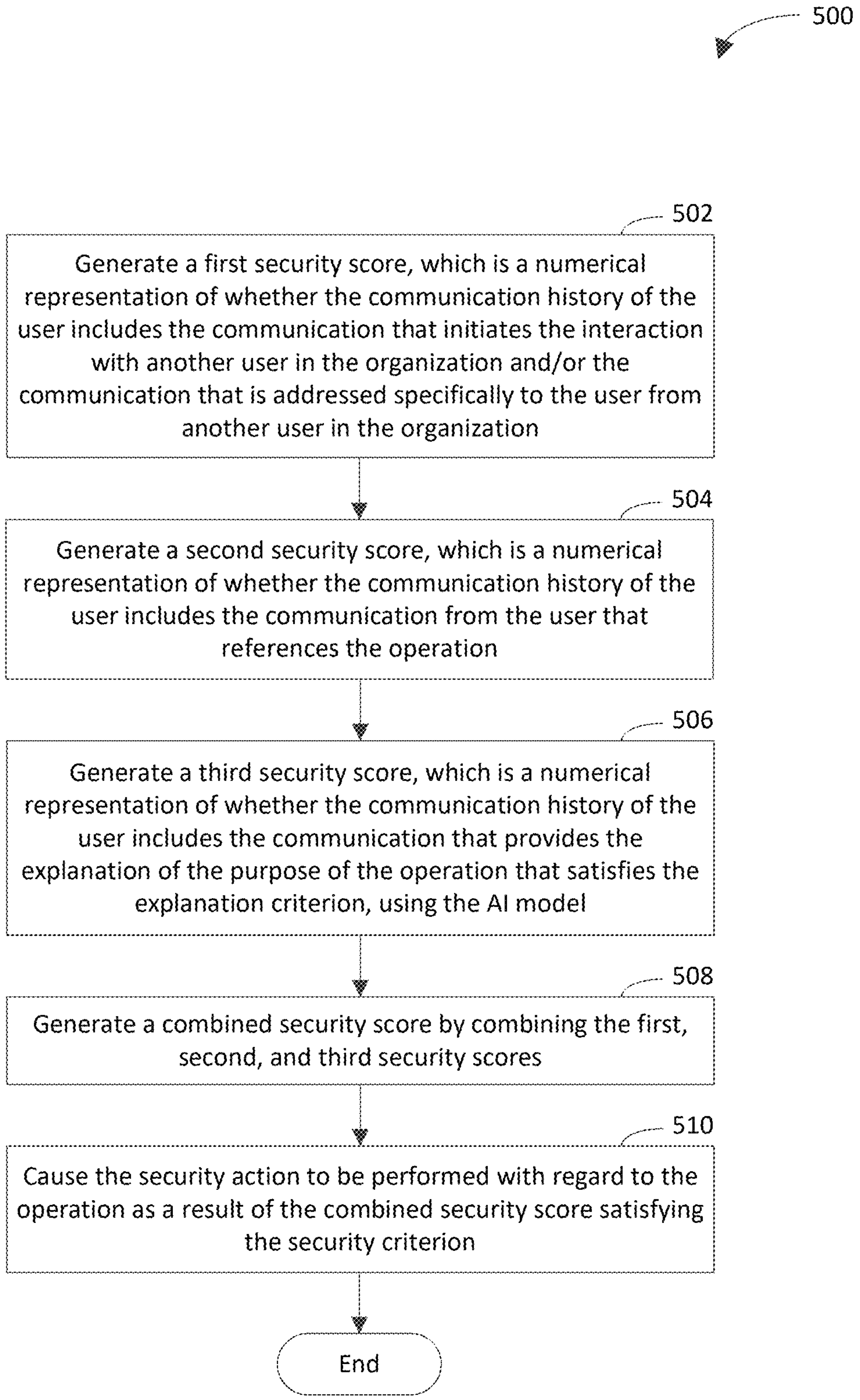
Figure 6:
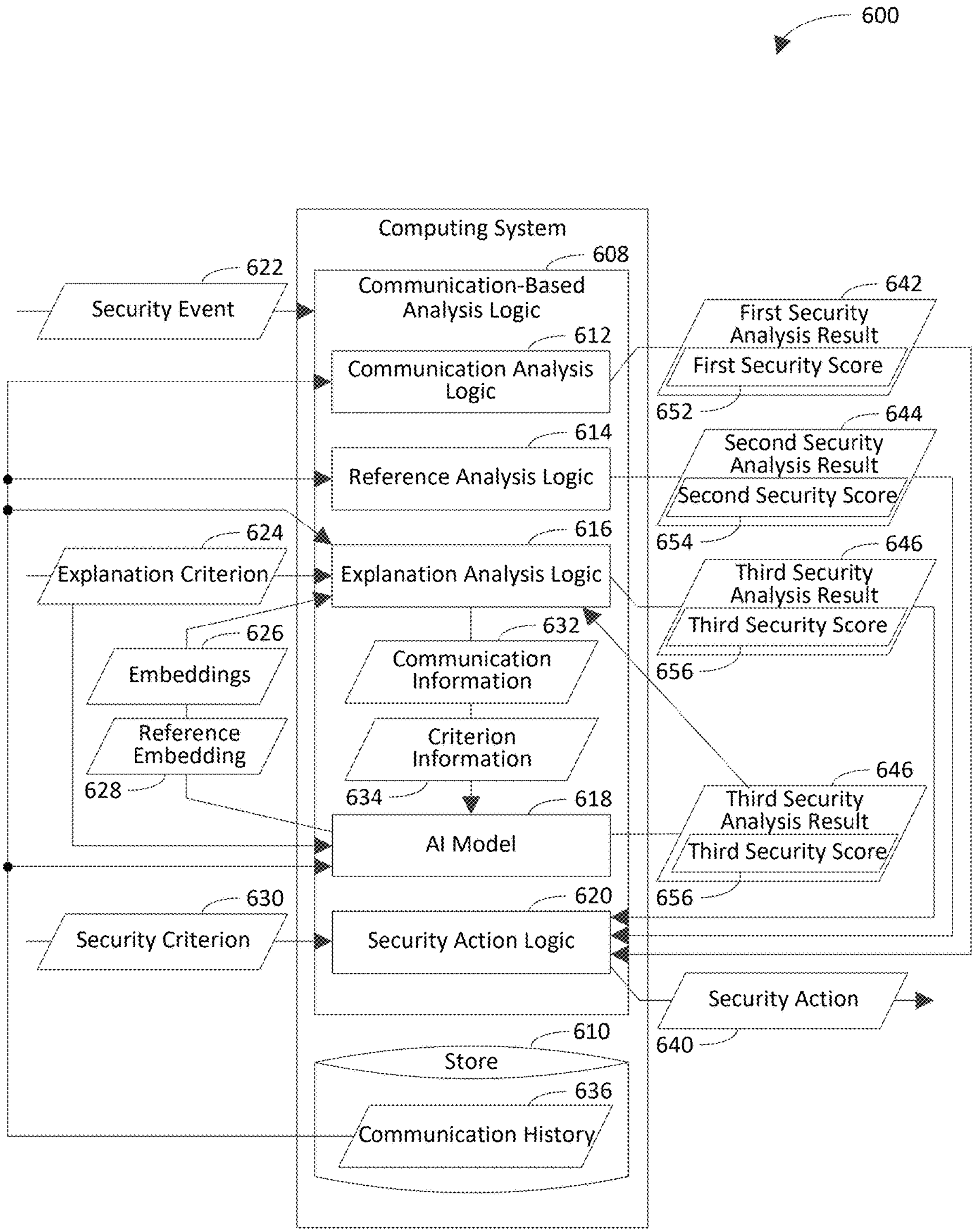
FIG. 6 is a block diagram of an example computing system in accordance with an embodiment.

In another example embodiment, the method of flowchart 200 further includes one or more of the steps shown in flowchart 500 of FIG. 5. As shown in FIG. 5, the method of flowchart 500 begins at step 502. In step 502, a first security score is generated. The first security score is a numerical representation of whether the communication history of the user includes a communication that initiates an interaction with another user in the organization and/or a communication that is addressed specifically to the user from another user in the organization. In an aspect, step 204 shown in FIG. 2 includes step 502. For instance, the first security analysis result may include the first security score. In an example implementation, the communication analysis logic 612 generates the first security score 652, which is a numerical representation of whether the communication history 636 includes a communication that initiates an interaction with another user in the organization and/or a communication that is addressed specifically to the user from another user in the organization.

At step 504, a second security score is generated. The second security score is a numerical representation of whether the communication history of the user includes a communication from the user that references the operation. In an aspect, step 206 shown in FIG. 2 includes step 504. For instance, the first security analysis result may include the first security score. In an example implementation, the reference analysis logic 614 generates the second security score 654, which is a numerical representation of whether the communication history 636 includes a communication from the user that references the operation.

At step 506, a third security score is generated. The third security score is a numerical representation of whether the communication history of the user includes a communication that provides an explanation of the purpose of the operation that satisfies the explanation criterion. In an aspect, step 208 shown in FIG. 2 includes step 506. For instance, the first security analysis result may include the first security score. In an example implementation, the explanation analysis logic 616 generates the third security score 656, which is a numerical representation of whether the communication history 636 includes a communication that provides an explanation of the purpose of the operation that satisfies the explanation criterion 624.

At step 508, a combined security score is generated by combining the first, second, and third security scores. For instance, the combined security score may be a normalized score (e.g., to be within a range from 0 to 100). In an example implementation, the security action logic 620 generates the combined security score by combining the first security score 652, the second security score 654, and the third security score 656.

At step 510, the security action is caused to be performed with regard to the operation as a result of the combined security score satisfying the security criterion. In an aspect, step 210 shown in FIG. 2 includes step 510. In an example implementation, the security action logic 620 causes the security action 640 to be performed with regard to the operation as a result of the combined security score satisfying the security criterion 630.

It will be recognized that the computing system 600 may not include one or more of the communication-based analysis logic 608, the store 610, the communication analysis logic 612, the reference analysis logic 614, the explanation analysis logic 616, the AI model 618, and/or the security action logic 620. Furthermore, the computing system 600 may include components in addition to or in lieu of the communication-based analysis logic 608, the store 610, the communication analysis logic 612, the reference analysis logic 614, the explanation analysis logic 616, the AI model 618, and/or the security action logic 620.

Figure 7:
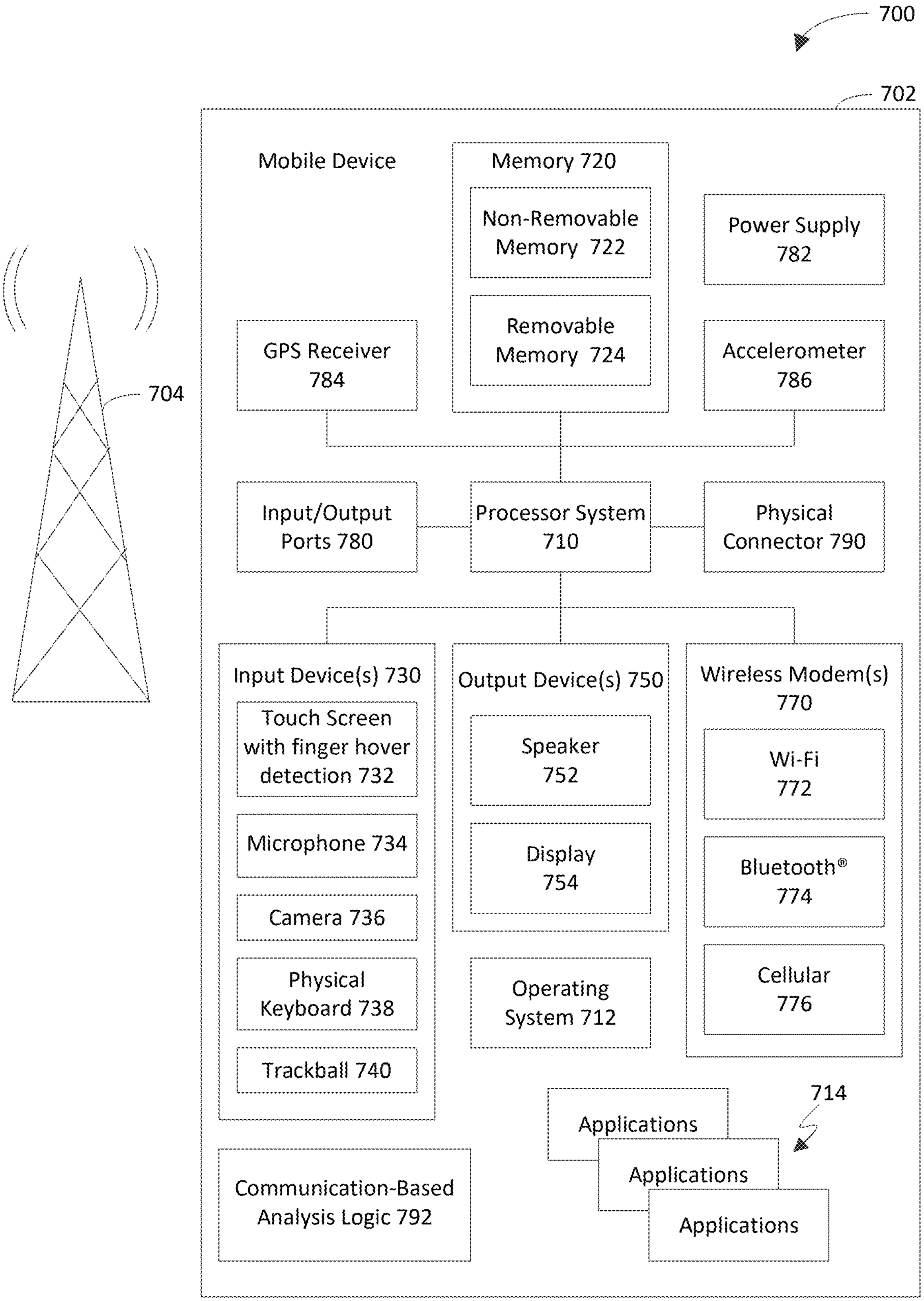
FIG. 7 is a system diagram of an example mobile device in accordance with an embodiment.

FIG. 7 is a system diagram of an example mobile device 700 including a variety of optional hardware and software components, shown generally as 702. Any components 702 in the mobile device may communicate with any other component, though not all connections are shown, for ease of illustration. The mobile device 700 may be any of a variety of computing devices (e.g., cell phone, smartphone, handheld computer, Personal Digital Assistant (PDA), etc.) and may allow wireless two-way communications with one or more mobile communications networks 704, such as a cellular or satellite network, or with a local area or wide area network.

The mobile device 700 includes a processor system 710 (e.g., signal processor, microprocessor, ASIC, or other control and processing logic circuitry) for performing such tasks as signal coding, data processing, input/output processing, power control, and/or other functions. An operating system 712 may control the allocation and usage of the components 702 and support for one or more applications 714 (a.k.a. application programs). The applications 714 may include common mobile computing applications (e.g., email applications, calendars, contact managers, web browsers, messaging applications) and any other computing applications (e.g., word processing applications, mapping applications, media player applications).

The mobile device 700 includes communication-based analysis logic 792, which is operable in a manner similar to the communication-based analysis logic 108 described above with reference to FIG. 1 and/or the communication-based analysis logic 608 described above with reference to FIG. 6.

The mobile device 700 includes memory 720. The memory 720 may include non-removable memory 722 and/or removable memory 724. The non-removable memory 722 may include random access memory (RAM), read-only memory (ROM), flash memory, a hard disk, or other well-known memory storage technologies. The removable memory 724 may include flash memory or a Subscriber Identity Module (SIM) card, which is well known in Global System for Mobile Communications (GSM) systems, or other well-known memory storage technologies, such as "smart cards." The memory 720 may store data and/or code for running the operating system 712 and the applications 714. Example data may include web pages, text, images, sound files, video data, or other data sets to be sent to and/or received from one or more network servers or other devices via one or more wired or wireless networks. Memory 720 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 700 may support one or more input devices 730, such as a touch screen 732, microphone 734, camera 736, physical keyboard 738 and/or trackball 740 and one or more output devices 750, such as a speaker 752 and a display 754. Touch screens, such as the touch screen 732, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 732 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 732 and display 754 may be combined in a single input/output device. The input devices 730 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 may include speech-recognition software as part of a voice control interface that allows a user to operate the mobile device 700 via voice commands. Furthermore, the mobile device 700 may include input devices and software that allows for user interaction via a user's spatial gestures, such as detecting and interpreting gestures to provide input to a gaming application.

Wireless modem(s) 770 may be coupled to antenna(s) (not shown) and may support two-way communications between the processor system 710 and external devices, as is well understood in the art. The modem(s) 770 are shown generically and may include a cellular modem 776 for communicating with the mobile communication network 704 and/or other radio-based modems (e.g., Bluetooth® 774 and/or Wi-Fi 772). At least one of the wireless modem(s) 770 is typically configured for communication with one or more cellular networks, such as a GSM network for data and voice communications within a single cellular network, between cellular networks, or between the mobile device and a public switched telephone network (PSTN).

The mobile device 700 may further include at least one input/output port 780, a power supply 782, a satellite navigation system receiver 784, such as a Global Positioning System (GPS) receiver, an accelerometer 786, and/or a physical connector 790, which may be a universal serial bus (USB) port, IEEE 1394 (FireWire) port, and/or RS-232 port. The illustrated components 702 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the communication-based analysis logic 108, the communication-based analysis logic 608, the communication analysis logic 612, the reference analysis logic 614, the explanation analysis logic 616, the AI model 618, the security action logic 620, flowchart 200, flowchart 300, flowchart 400, and/or flowchart 500 may be implemented in hardware, software, firmware, or any combination thereof.

For example, any one or more of the communication-based analysis logic 108, the communication-based analysis logic 608, the communication analysis logic 612, the reference analysis logic 614, the explanation analysis logic 616, the AI model 618, the security action logic 620, flowchart 200, flowchart 300, flowchart 400, and/or flowchart 500 may be implemented, at least in part, as computer program code configured to be executed in one or more processors.

In another example, any one or more of the communication-based analysis logic 108, the communication-based analysis logic 608, the communication analysis logic 612, the reference analysis logic 614, the explanation analysis logic 616, the AI model 618, the security action logic 620, flowchart 200, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
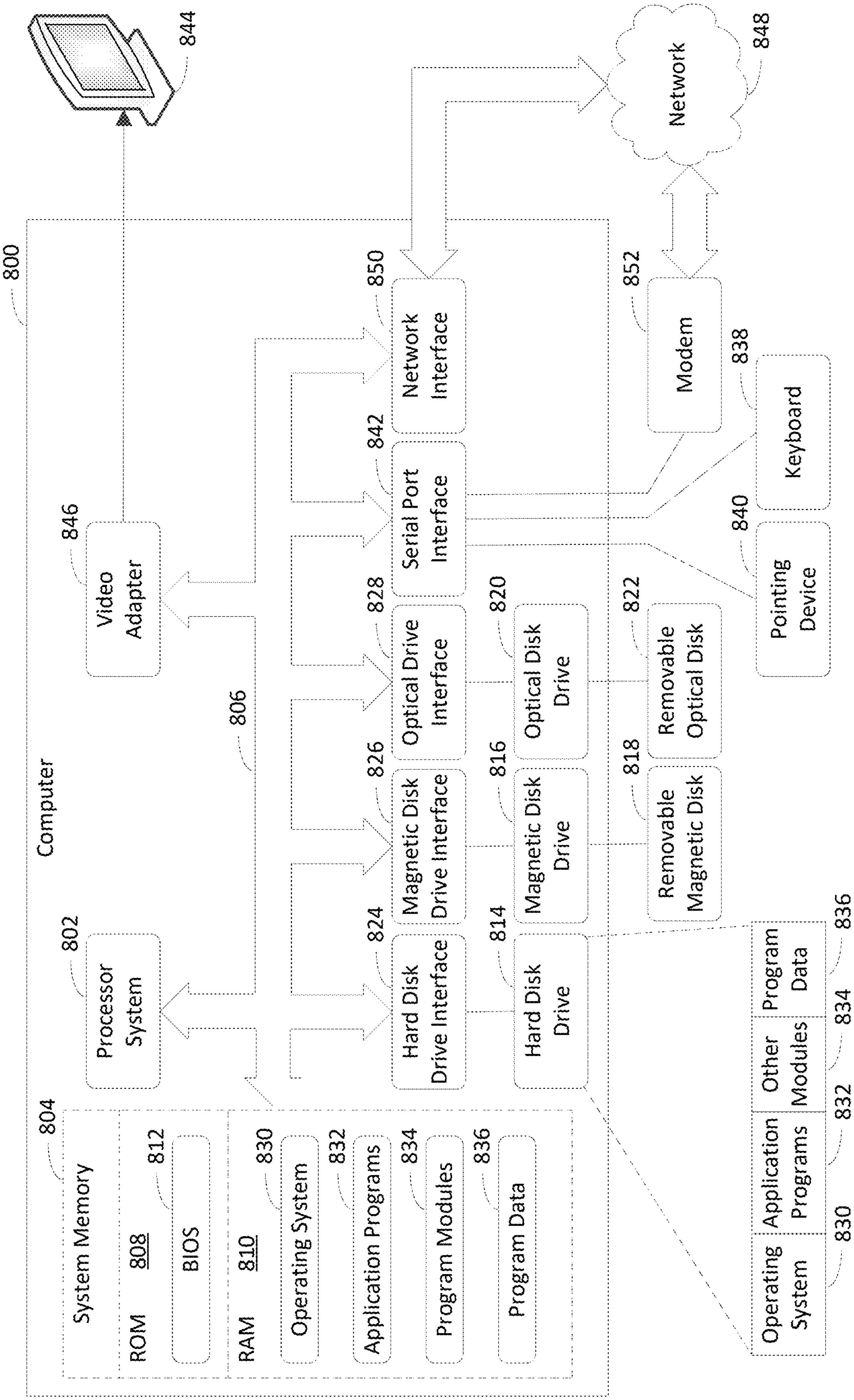
FIG. 8 depicts an example computer in which embodiments may be implemented.

II. Further Discussion of Some Example Embodiments (A1) An example system (FIG. 1, 102A-102M, 106A-106N; FIGS. 6, 600; FIGS. 7, 702; FIGS. 8, 800) comprises a processor system (FIGS. 7, 710; FIGS. 8, 802) and a memory (FIGS. 7, 720, 722, 724; FIGS. 8, 804, 808, 810) that stores computer-executable instructions. The computer-executable instructions are executable by the processor system to at least detect (FIGS. 2, 202) a security event (FIGS. 6, 622) triggered by an operation that is performed by a user in an organization. The computer-executable instructions are executable by the processor system further to at least generate (FIGS. 2, 204) a first security analysis result (FIGS. 6, 642) by determining whether a communication history (FIGS. 6, 636) of the user comprises at least one of a first communication from the user that initiates an interaction with another user in the organization or a second communication that is addressed specifically to the user from another user in the organization. The computer-executable instructions are executable by the processor system further to at least generate (FIGS. 2, 206) a second security analysis result (FIGS. 6, 644) by determining whether the communication history of the user comprises a third communication from the user that references the operation. The computer-executable instructions are executable by the processor system further to at least generate (FIGS. 2, 208) a third security analysis result (FIGS. 6, 646), which comprises determining whether the communication history of the user comprises a fourth communication that provides an explanation of a purpose of the operation that satisfies an explanation criterion (FIGS. 6, 624), using an artificial intelligence (AI) model (FIGS. 6, 618). The computer-executable instructions are executable by the processor system further to at least, in response to the security event, trigger (FIGS. 2, 210) execution of an instruction, which causes a security action (FIGS. 6, 640) to be performed with regard to the operation as a result of a combination of the first, second, and third security analysis results satisfying a security criterion (FIGS. 6, 630).

(A2) In the example system of A1, wherein the computer-executable instructions are executable by the processor system to at least: generate the first security analysis result by determining at least one of a number of first communications in the communication history that are from the user and that initiate an interaction with another user in the organization or a number of second communications in the communication history that are addressed specifically to the user from another user in the organization.

(A3) In the example system of any of A1-A2, wherein the computer-executable instructions are executable by the processor system to at least: generate the second security analysis result by determining a number of third communications in the communication history that are from the user and that reference the operation.

(A4) In the example system of any of A1-A3, wherein the computer-executable instructions are executable by the processor system to at least: generate the third security analysis result by determining whether a value of an attribute of a user-generated communication, which is generated by the user and which references the operation, in the communication history of the user corresponds to a reference value of the attribute of a reference user-generated communication, which references a historical operation that corresponds to the operation performed by the user.

(A5) In the example system of any of A1-A4, wherein the computer-executable instructions are executable by the processor system to at least: generate the third security analysis result by determining whether a value of an attribute of a system-generated communication, which is generated by a system utilized by the user and which references the operation, corresponds to a reference value of the attribute of a reference system-generated communication, which references a historical operation that corresponds to the operation performed by the user.

(A6) In the example system of any of A1-A5, wherein the computer-executable instructions are executable by the processor system to at least: generate the third security analysis result by determining whether the fourth communication provides the explanation that satisfies the explanation criterion by determining whether the fourth communication is a request, which is received by the user, to perform the operation and further by determining whether the request corresponds to a business role of the user.

(A7) In the example system of any of A1-A6, wherein the computer-executable instructions are executable by the processor system to at least: generate embeddings that represent communications in the communication history of the user; and generate the third security analysis result by causing the AI model to compare the embeddings, which represent the communications in the communication history of the user, to a reference embedding, which represents the explanation criterion; and wherein an extent to which an embedding of the fourth communication corresponds to the reference embedding indicates whether the fourth communication provides the explanation of the purpose of the operation that satisfies the explanation criterion.

(A8) In the example system of any of A1-A7, wherein the first security analysis result comprises a first security score, which is a numerical representation of whether the communication history of the user comprises at least one of the first communication that initiates the interaction with another user in the organization or the second communication that is addressed specifically to the user from another user in the organization; wherein the second security analysis result comprises a second security score, which is a numerical representation of whether the communication history of the user comprises the third communication from the user that references the operation; wherein the third security analysis result comprises a third security score, which is a numerical representation of whether the communication history of the user comprises the fourth communication that provides the explanation of the purpose of the operation that satisfies the explanation criterion; and wherein the computer-executable instructions are executable by the processor system to at least: generate a combined security score by combining the first, second, and third security scores; and cause the security action to be performed with regard to the operation as a result of the combined security score satisfying the security criterion.

(A9) In the example system of any of A1-A8, wherein the computer-executable instructions are executable by the processor system to at least: generate a first security score, which corresponds to at least one of a number of first communications in the communication history that are from the user and that initiate an interaction with another user in the organization or a number of second communications in the communication history that are addressed specifically to the user from another user in the organization; generate a second security score, which corresponds to a number of third communications in the communication history that are from the user and that reference the operation; generate a third security score, which corresponds to an extent to which the explanation provided by the fourth communication satisfies the explanation criterion; and perform the security action with regard to the operation as a result of a combination of the first, second, and third security scores satisfying the security criterion.

(B1) An example method is implemented by a computing system (FIG. 1, 102A-102M, 106A-106N; FIGS. 6, 600; FIGS. 7, 702; FIGS. 8, 800). The method comprises detecting (FIGS. 2, 202) a security event (FIGS. 6, 622) triggered by an operation that is performed by a user in an organization. The method further comprises generating (FIGS. 2, 204) a first security analysis result (FIGS. 6, 642) by determining whether a communication history (FIGS. 6, 636) of the user comprises at least one of a first communication from the user that initiates an interaction with another user in the organization or a second communication that is addressed specifically to the user from another user in the organization. The method further comprises generating (FIGS. 2, 206) a second security analysis result (FIGS. 6, 644) by determining whether the communication history of the user comprises a third communication from the user that references the operation. The method further comprises causing (FIGS. 2, 208) an artificial intelligence (AI) model (FIGS. 6, 618) to generate a third security analysis result (FIGS. 6, 646) by determining whether the communication history of the user comprises a fourth communication that provides an explanation of a purpose of the operation that satisfies an explanation criterion (FIGS. 6, 624). The method further comprises, in response to the security event, triggering (FIGS. 2, 210) execution of an instruction, which causes a security action (FIGS. 6, 640) to be performed with regard to the operation by selecting the security action from a plurality of security actions as a result of a combination of the first, second, and third security analysis results satisfying a security criterion (FIGS. 6, 630).

(B2) In the example method of B1, wherein generating the first security analysis result comprises: determining at least one of a number of first communications in the communication history that are from the user and that initiate an interaction with another user in the organization or a number of second communications in the communication history that are addressed specifically to the user from another user in the organization.

(B3) In the example method of any of B1-B2, wherein generating the second security analysis result comprises: determining a number of third communications in the communication history that are from the user and that reference the operation.

(B4) In the example method of any of B1-B3, wherein causing the AI model to generate the third security analysis result comprises: causing the AI model to determine whether a value of an attribute of a user-generated communication, which is generated by the user and which references the operation, in the communication history of the user corresponds to a reference value of the attribute of a reference user-generated communication, which references a historical operation that corresponds to the operation performed by the user.

(B5) In the example method of any of B1-B4, wherein causing the AI model to generate the third security analysis result comprises: causing the AI model to determine whether a value of an attribute of a system-generated communication, which is generated by a system utilized by the user and which references the operation, corresponds to a reference value of the attribute of a reference system-generated communication, which references a historical operation that corresponds to the operation performed by the user.

(B6) In the example method of any of B1-B5, wherein causing the AI model to generate the third security analysis result comprises: causing the AI model to determine whether the fourth communication provides the explanation that satisfies the explanation criterion by determining whether the fourth communication is a request, which is received by the user, to perform the operation and further by determining whether the request corresponds to a business role of the user.

(B7) In the example method of any of B1-B6, further comprising: generating embeddings that represent communications in the communication history of the user; wherein causing the AI model to generate the third security analysis result comprises: causing the AI model to compare the embeddings, which represent the communications in the communication history of the user, to a reference embedding, which represents the explanation criterion; and wherein an extent to which an embedding of the fourth communication corresponds to the reference embedding indicates whether the fourth communication provides the explanation of the purpose of the operation that satisfies the explanation criterion.

(B8) In the example method of any of B1-B7, wherein the first security analysis result comprises a first security score, which is a numerical representation of whether the communication history of the user comprises at least one of the first communication that initiates the interaction with another user in the organization or the second communication that is addressed specifically to the user from another user in the organization; wherein the second security analysis result comprises a second security score, which is a numerical representation of whether the communication history of the user comprises the third communication from the user that references the operation; wherein the third security analysis result comprises a third security score, which is a numerical representation of whether the communication history of the user comprises the fourth communication that provides the explanation of the purpose of the operation that satisfies the explanation criterion; wherein the method further comprises: generating a combined security score by combining the first, second, and third security scores; and wherein triggering the execution of the instruction comprises: causing the security action to be performed with regard to the operation as a result of the combined security score satisfying the security criterion.

(B9) In the example method of any of B1-B8, wherein generating the first security analysis result comprises: generating a first security score, which corresponds to at least one of a number of first communications in the communication history that are from the user and that initiate an interaction with another user in the organization or a number of second communications in the communication history that are addressed specifically to the user from another user in the organization; wherein generating the second security analysis result comprises: generating a second security score, which corresponds to a number of third communications in the communication history that are from the user and that reference the operation; wherein causing the AI model to generate the third security analysis result comprises: causing the AI model to generate a third security score, which corresponds to an extent to which the explanation provided by the fourth communication satisfies the explanation criterion; and wherein performing the security action comprises: performing the security action with regard to the operation as a result of a combination of the first, second, and third security scores satisfying the security criterion.

(C1) A first example computer program product (FIGS. 6, 624; FIGS. 7, 718, 722) comprises a computer-readable storage medium having instructions recorded thereon for enabling a processor-based system (FIG. 1, 102A-102M, 106A-106N; FIGS. 3, 300; FIGS. 6, 602; FIGS. 7, 700) to perform operations. The operations comprise generating (FIGS. 2, 204) a first security analysis result (FIGS. 6, 642) by determining whether a communication history (FIGS. 6, 636) of a user in an organization who performs an operation that triggers a security event (FIGS. 6, 622) comprises at least one of a first communication from the user that initiates an interaction with another user in the organization or a second communication that is addressed specifically to the user from another user in the organization. The operations further comprise generating (FIGS. 2, 206) a second security analysis result (FIGS. 6, 644) by determining whether the communication history of the user comprises a third communication from the user that references the operation. The operations further comprise generating (FIGS. 2, 208) a third security analysis result (FIGS. 6, 646), which comprises determining whether the communication history of the user comprises a fourth communication that provides an explanation of a purpose of the operation that satisfies an explanation criterion (FIGS. 6, 624), using an artificial intelligence (AI) model (FIGS. 6, 618) by causing the AI model to analyze content of the fourth communication in context of the explanation criterion. The operations further comprise, in response to the security event, triggering (FIG. 2, 210) execution of an instruction, which causes a security action (FIGS. 6, 640) to be performed with regard to the operation as a result of a combination of the first, second, and third security analysis results satisfying a security criterion (FIGS. 6, 630).

III. Example Computer System

FIG. 8 depicts an example computer 800 in which embodiments may be implemented. Any one or more of the user devices 102A-102M and/or any one or more of the servers 106A-106N shown in FIG. 1 and/or the computing system 600 shown in FIG. 6 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processor system 802, a system memory 804, and a bus 806 that couples various system components including system memory 804 to processor system 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the communication-based analysis logic 108, the communication-based analysis logic 608, the communication analysis logic 612, the reference analysis logic 614, the explanation analysis logic 616, the AI model 618, the security action logic 620, flowchart 200 (including any step of flowchart 200), flowchart 300 (including any step of flowchart 300), flowchart 400 (including any step of flowchart 400), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processor system 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface 850 (e.g., a network or adapter), a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

detect a security event triggered by an operation that is performed by a user in an organization;

generate a first security analysis result by determining whether a communication history of the user comprises at least one of a first communication from the user that initiates an interaction with another user in the organization or a second communication that is addressed specifically to the user from another user in the organization;

generate a second security analysis result by determining whether the communication history of the user comprises a third communication from the user that references the operation;

generate a third security analysis result, which comprises determining whether the communication history of the user comprises a fourth communication that provides an explanation of a purpose of the operation that satisfies an explanation criterion, using an artificial intelligence (AI) model; and in response to the security event, trigger execution of an instruction, which causes a security action to be performed with regard to the operation as a result of a combination of the first, second, and third security analysis results satisfying a security criterion.

2. The system of claim 1, wherein the computer-executable instructions are executable by the processor system to at least:

generate the first security analysis result by determining at least one of a number of first communications in the communication history that are from the user and that initiate an interaction with another user in the organization or a number of second communications in the communication history that are addressed specifically to the user from another user in the organization.

3. The system of claim 1, wherein the computer-executable instructions are executable by the processor system to at least:

generate the second security analysis result by determining a number of third communications in the communication history that are from the user and that reference the operation.

4. The system of claim 1, wherein the computer-executable instructions are executable by the processor system to at least:

generate the third security analysis result by determining whether a value of an attribute of a user-generated communication, which is generated by the user and which references the operation, in the communication history of the user corresponds to a reference value of the attribute of a reference user-generated communication, which references a historical operation that corresponds to the operation performed by the user.

5. The system of claim 1, wherein the computer-executable instructions are executable by the processor system to at least:

generate the third security analysis result by determining whether a value of an attribute of a system-generated communication, which is generated by a system utilized by the user and which references the operation, corresponds to a reference value of the attribute of a reference system-generated communication, which references a historical operation that corresponds to the operation performed by the user.

6. The system of claim 1, wherein the computer-executable instructions are executable by the processor system to at least:

generate the third security analysis result by determining whether the fourth communication provides the explanation that satisfies the explanation criterion by determining whether the fourth communication is a request, which is received by the user, to perform the operation and further by determining whether the request corresponds to a business role of the user.

7. The system of claim 1, wherein the computer-executable instructions are executable by the processor system to at least:

generate embeddings that represent communications in the communication history of the user; and generate the third security analysis result by causing the AI model to compare the embeddings, which represent the communications in the communication history of the user, to a reference embedding, which represents the explanation criterion; and wherein an extent to which an embedding of the fourth communication corresponds to the reference embedding indicates whether the fourth communication provides the explanation of the purpose of the operation that satisfies the explanation criterion.

8. The system of claim 1, wherein the first security analysis result comprises a first security score, which is a numerical representation of whether the communication history of the user comprises at least one of the first communication that initiates the interaction with another user in the organization or the second communication that is addressed specifically to the user from another user in the organization;

wherein the second security analysis result comprises a second security score, which is a numerical representation of whether the communication history of the user comprises the third communication from the user that references the operation;

wherein the third security analysis result comprises a third security score, which is a numerical representation of whether the communication history of the user comprises the fourth communication that provides the explanation of the purpose of the operation that satisfies the explanation criterion; and wherein the computer-executable instructions are executable by the processor system to at least:

generate a combined security score by combining the first, second, and third security scores; and cause the security action to be performed with regard to the operation as a result of the combined security score satisfying the security criterion.

9. The system of claim 1, wherein the computer-executable instructions are executable by the processor system to at least:

generate a first security score, which corresponds to at least one of a number of first communications in the communication history that are from the user and that initiate an interaction with another user in the organization or a number of second communications in the communication history that are addressed specifically to the user from another user in the organization;

generate a second security score, which corresponds to a number of third communications in the communication history that are from the user and that reference the operation;

generate a third security score, which corresponds to an extent to which the explanation provided by the fourth communication satisfies the explanation criterion; and perform the security action with regard to the operation as a result of a combination of the first, second, and third security scores satisfying the security criterion.

10. A method implemented by a computing system, the method comprising:

detecting a security event triggered by an operation that is performed by a user in an organization;

generating a first security analysis result by determining whether a communication history of the user comprises at least one of a first communication from the user that initiates an interaction with another user in the organization or a second communication that is addressed specifically to the user from another user in the organization;

generating a second security analysis result by determining whether the communication history of the user comprises a third communication from the user that references the operation;

causing an artificial intelligence (AI) model to generate a third security analysis result by determining whether the communication history of the user comprises a fourth communication that provides an explanation of a purpose of the operation that satisfies an explanation criterion; and in response to the security event, triggering execution of an instruction, which causes a security action to be performed with regard to the operation by selecting the security action from a plurality of security actions as a result of a combination of the first, second, and third security analysis results satisfying a security criterion.

11. The method of claim 10, wherein generating the first security analysis result comprises:

determining at least one of a number of first communications in the communication history that are from the user and that initiate an interaction with another user in the organization or a number of second communications in the communication history that are addressed specifically to the user from another user in the organization.

12. The method of claim 10, wherein generating the second security analysis result comprises:

determining a number of third communications in the communication history that are from the user and that reference the operation.

13. The method of claim 10, wherein causing the AI model to generate the third security analysis result comprises:

causing the AI model to determine whether a value of an attribute of a user-generated communication, which is generated by the user and which references the operation, in the communication history of the user corresponds to a reference value of the attribute of a reference user-generated communication, which references a historical operation that corresponds to the operation performed by the user.

14. The method of claim 10, wherein causing the AI model to generate the third security analysis result comprises:

causing the AI model to determine whether a value of an attribute of a system-generated communication, which is generated by a system utilized by the user and which references the operation, corresponds to a reference value of the attribute of a reference system-generated communication, which references a historical operation that corresponds to the operation performed by the user.

15. The method of claim 10, wherein causing the AI model to generate the third security analysis result comprises:

causing the AI model to determine whether the fourth communication provides the explanation that satisfies the explanation criterion by determining whether the fourth communication is a request, which is received by the user, to perform the operation and further by determining whether the request corresponds to a business role of the user.

16. The method of claim 10, further comprising:

generating embeddings that represent communications in the communication history of the user;

wherein causing the AI model to generate the third security analysis result comprises:

causing the AI model to compare the embeddings, which represent the communications in the communication history of the user, to a reference embedding, which represents the explanation criterion; and wherein an extent to which an embedding of the fourth communication corresponds to the reference embedding indicates whether the fourth communication provides the explanation of the purpose of the operation that satisfies the explanation criterion.

17. The method of claim 10, wherein the first security analysis result comprises a first security score, which is a numerical representation of whether the communication history of the user comprises at least one of the first communication that initiates the interaction with another user in the organization or the second communication that is addressed specifically to the user from another user in the organization;

wherein the second security analysis result comprises a second security score, which is a numerical representation of whether the communication history of the user comprises the third communication from the user that references the operation;

wherein the third security analysis result comprises a third security score, which is a numerical representation of whether the communication history of the user comprises the fourth communication that provides the explanation of the purpose of the operation that satisfies the explanation criterion;

wherein the method further comprises:

generating a combined security score by combining the first, second, and third security scores; and wherein triggering the execution of the instruction comprises:

causing the security action to be performed with regard to the operation as a result of the combined security score satisfying the security criterion.

18. The method of claim 10, wherein generating the first security analysis result comprises:

generating a first security score, which corresponds to at least one of a number of first communications in the communication history that are from the user and that initiate an interaction with another user in the organization or a number of second communications in the communication history that are addressed specifically to the user from another user in the organization;

wherein generating the second security analysis result comprises:

generating a second security score, which corresponds to a number of third communications in the communication history that are from the user and that reference the operation;

wherein causing the AI model to generate the third security analysis result comprises:

causing the AI model to generate a third security score, which corresponds to an extent to which the explanation provided by the fourth communication satisfies the explanation criterion; and wherein performing the security action comprises:

performing the security action with regard to the operation as a result of a combination of the first, second, and third security scores satisfying the security criterion.

19. A computer program product comprising a computer-readable storage medium having instructions recorded thereon for enabling a processor-based system to perform operations, the operations comprising:

generating a first security analysis result by determining whether a communication history of a user in an organization who performs an operation that triggers a security event comprises at least one of a first communication from the user that initiates an interaction with another user in the organization or a second communication that is addressed specifically to the user from another user in the organization;

generating a second security analysis result by determining whether the communication history of the user comprises a third communication from the user that references the operation;

generating a third security analysis result, which comprises determining whether the communication history of the user comprises a fourth communication that provides an explanation of a purpose of the operation that satisfies an explanation criterion, using an artificial intelligence (AI) model by causing the AI model to analyze content of the fourth communication in context of the explanation criterion; and in response to the security event, triggering execution of an instruction, which causes a security action to be performed with regard to the operation as a result of a combination of the first, second, and third security analysis results satisfying a security criterion.

20. The computer program product of claim 19, wherein the third security analysis result is generated by performing at least one of the following:

determining whether a value of an attribute of a user-generated communication, which is generated by the user and which references the operation, in the communication history of the user corresponds to a first reference value of the attribute of a reference user-generated communication, which references a first historical operation that corresponds to the operation performed by the user;

determining whether a value of an attribute of a system-generated communication, which is generated by a system utilized by the user and which references the operation, corresponds to a second reference value of the attribute of a reference system-generated communication, which references a second historical operation that corresponds to the operation performed by the user; or determining whether the fourth communication is a request, which is received by the user, to perform the operation and further by determining whether the request corresponds to a business role of the user.

* * * * *